United States Patent
Pick et al.

(10) Patent No.: US 11,665,026 B2
(45) Date of Patent: May 30, 2023

(54) INPHASE AND QUADRATURE MISMATCH ESTIMATION PILOT SIGNALING

(71) Applicant: QUALCOMM Incorporated, San Diego, CA (US)

(72) Inventors: Jacob Pick, Beit Zayit (IL); Assaf Touboul, Netanya (IL); Ronen Shaked, Kfar Saba (IL); Guy Wolf, Rosh Haayin (IL); Shay Landis, Hod Hasharon (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 17/232,039

(22) Filed: Apr. 15, 2021

(65) Prior Publication Data
US 2021/0328837 A1 Oct. 21, 2021

Related U.S. Application Data

(60) Provisional application No. 63/012,022, filed on Apr. 17, 2020.

(51) Int. Cl.
*H04L 25/02* (2006.01)
*H04W 72/0453* (2023.01)

(52) U.S. Cl.
CPC ........ *H04L 25/0204* (2013.01); *H04L 25/022* (2013.01); *H04L 25/0224* (2013.01); *H04W 72/0453* (2013.01)

(58) Field of Classification Search
CPC ............... H04L 25/0204; H04L 25/022; H04L 25/0224; H04W 72/0453
See application file for complete search history.

(56) References Cited

U.S. PATENT DOCUMENTS

| | | |
|---|---|---|
| 7,251,291 B1 | 7/2007 | Dubuc et al. |
| 9,148,325 B2 | 9/2015 | Hamila et al. |
| 2010/0172309 A1 | 7/2010 | Forenza et al. |

OTHER PUBLICATIONS

International Search Report and Written Opinion—PCT/US2021/027737—ISA/EPO—dated Jul. 9, 2021 (203407WO).

*Primary Examiner* — Natasha W Cosme
(74) *Attorney, Agent, or Firm* — Arun Swain; Holland & Hart LLP

(57) ABSTRACT

Methods, systems, and devices for wireless communications are described. A user equipment (UE) may receive pilot signaling associated with inphase and quadrature (IQ) mismatch estimation for a set of antennas of a base station. The UE may measure pilot signals for each of the set of antennas based on a pilot signal pattern of the pilot signaling, and calculate an estimation of an IQ mismatch for each antenna of the set of antennas of the base station based on measuring the pilot signals. The base station may receive, from the UE, a report including an indication of the estimation of the IQ mismatch for each antenna of the set of antennas of the base station based on the pilot signals.

30 Claims, 16 Drawing Sheets

INPHASE AND QUADRATURE MISMATCH ESTIMATION PILOT SIGNALING

CROSS REFERENCE

The present Application for Patent claims the benefit of U.S. Provisional Patent Application No. 63/012,022 by PICK et al., entitled "INPHASE AND QUADRATURE MISMATCH ESTIMATION PILOT SIGNALING," filed Apr. 17, 2020, assigned to the assignee hereof, and expressly incorporated by reference herein as if fully set forth below and for all applicable purposes.

FIELD OF TECHNOLOGY

The following relates generally to wireless communications and more specifically to inphase and quadrature (IQ) mismatch estimation pilot signaling. A user equipment (UE) supporting IQ mismatch estimation may experience reduced power consumption by improving the reliability and reducing latency of wireless communications as described herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

In some wireless communications systems, a base station may experience inphase and quadrature (IQ) mismatch for downlink transmissions. For example, a receiver at a UE receiving a downlink message from the base station may translate the received radio frequency (RF) signal in order to decode the information indicated by the RF signal. However, based on how the receive chain at the UE handles the RF signal (e.g., the IQ signal paths), the reception process may suffer from IQ mismatch. This IQ mismatch may set a noise floor at the receiving UE for the downlink message. Such a noise floor may negatively impact reception reliability at the UE, for example, for messages with relatively high modulation and coding scheme (MCS) values, messages transmitted using multiple spatial streams, or both.

SUMMARY

Various aspects of the described techniques relate to configuring a communication device, which may be otherwise known as a user equipment (UE), a base station (e.g., a NodeB or giga-NodeB (either of which may be referred to as a gNB)), and/or other communication device to support in-phase and quadrature-phase (IQ) mismatch estimation. For example, multiple UEs may be configured to receive pilot signaling associated with IQ mismatch estimation for a set of antennas (also referred to as transmit antennas or receive antennas, or transmit/receive antennas) of the base station. The UEs may measure pilot signals for each of the set of antennas based on a pilot signal pattern of the pilot signaling. The pilot signal pattern may extend over a bandwidth for each UE. In some examples, the pilot signal pattern may be symmetric over a bandwidth allocation. The UEs may calculate an estimation of IQ mismatch for each antenna of the set of antennas of the base station based on measuring the pilot signals, and transmit a report including an indication of the estimation of the IQ mismatch for each antenna of the set of antennas of the base station. The base station may receive the report including an estimation of the IQ mismatch, and perform an IQ mismatch correction. As a result, the base station and the UEs may support higher accuracy for IQ mismatch correction in wireless communications systems experiencing IQ mismatch.

A method of wireless communication at a UE is described. The method may include receiving pilot signaling associated with IQ mismatch estimation for a set of transmit antennas of a base station, measuring pilot signals for each of the set of transmit antennas based on a pilot signal pattern of the pilot signaling, and calculating an estimation of an IQ mismatch for each transmit antenna of the set of transmit antennas of the base station based on measuring the pilot signals.

An apparatus for wireless communication is described. The apparatus may include a processor, memory coupled with the processor, and instructions stored in the memory. The instructions may be executable by the processor to cause the apparatus to receive pilot signaling associated with IQ mismatch estimation for a set of transmit antennas of a base station, measure pilot signals for each of the set of transmit antennas based on a pilot signal pattern of the pilot signaling, and calculate an estimation of an IQ mismatch for each transmit antenna of the set of transmit antennas of the base station based on measuring the pilot signals.

Another apparatus for wireless communication is described. The apparatus may include means for receiving pilot signaling associated with IQ mismatch estimation for a set of transmit antennas of a base station, measuring pilot signals for each of the set of transmit antennas based on a pilot signal pattern of the pilot signaling, and calculating an estimation of an IQ mismatch for each transmit antenna of the set of transmit antennas of the base station based on measuring the pilot signals.

A non-transitory computer-readable medium storing code for wireless communication at a UE is described. The code may include instructions executable by a processor to receive pilot signaling associated with IQ mismatch estimation for a set of transmit antennas of a base station, measure pilot signals for each of the set of transmit antennas based on a pilot signal pattern of the pilot signaling, and calculate an estimation of an IQ mismatch for each transmit antenna of the set of transmit antennas of the base station based on measuring the pilot signals.

Some examples of the method, apparatuses, and non-transitory computer-readable medium described herein may further include operations, features, means, or instructions for transmitting a report including an indication of the estimation of the IQ mismatch for each transmit antenna of the set of transmit antennas of the base station.

Some examples of the method, apparatuses, and non-transitory computer-readable medium described herein may further include operations, features, means, or instructions for receiving configuration signaling that configures the pilot signal pattern for each of the set of transmit antennas of the base station.

In some examples of the method, apparatuses, and non-transitory computer-readable medium described herein, the configuration signaling includes a period associated with the pilot signaling.

In some examples of the method, apparatuses, and non-transitory computer-readable medium described herein, the pilot signal pattern extends over a bandwidth for the UE.

In some examples of the method, apparatuses, and non-transitory computer-readable medium described herein, the pilot signal pattern may be symmetric over a bandwidth allocation.

In some examples of the method, apparatuses, and non-transitory computer-readable medium described herein, the pilot signal pattern may be symmetric with respect to a frequency bin associated with the bandwidth allocation.

In some examples of the method, apparatuses, and non-transitory computer-readable medium described herein, the frequency bin corresponds to a center frequency of the bandwidth allocation.

Some examples of the method, apparatuses, and non-transitory computer-readable medium described herein may further include operations, features, means, or instructions for determining an estimation of a signal-to-noise ratio (SNR) for each of the set of transmit antennas of the base station based on the pilot signal pattern of the pilot signaling.

Some examples of the method, apparatuses, and non-transitory computer-readable medium described herein may further include operations, features, means, or instructions for determining an estimation of a channel for each of the set of transmit antennas of the base station based on the pilot signal pattern of the pilot signaling, and where calculating the estimation of the IQ mismatch for each transmit antenna of the set of transmit antennas of the base station may be based on the estimation of the channel.

A method of wireless communication at a base station is described. The method may include determining a pilot signal pattern of a pilot signaling for IQ mismatch estimation for a set of transmit antennas of the base station, transmitting pilot signals for each of the set of transmit antennas based on the pilot signal pattern of the pilot signaling, and receiving a report including an indication of the estimation of the IQ mismatch for each transmit antenna of the set of transmit antennas of the base station based on the transmitted pilot signals.

An apparatus for wireless communication is described. The apparatus may include a processor, memory coupled with the processor, and instructions stored in the memory. The instructions may be executable by the processor to cause the apparatus to determine a pilot signal pattern of a pilot signaling for IQ mismatch estimation for a set of transmit antennas of the apparatus, transmit pilot signals for each of the set of transmit antennas based on the pilot signal pattern of the pilot signaling, and receive a report including an indication of the estimation of the IQ mismatch for each transmit antenna of the set of transmit antennas of the apparatus based on the transmitted pilot signals.

Another apparatus for wireless communication is described. The apparatus may include means for determining a pilot signal pattern of a pilot signaling for IQ mismatch estimation for a set of transmit antennas of the apparatus, transmitting pilot signals for each of the set of transmit antennas based on the pilot signal pattern of the pilot signaling, and receiving a report including an indication of the estimation of the IQ mismatch for each transmit antenna of the set of transmit antennas of the apparatus based on the transmitted pilot signals.

A non-transitory computer-readable medium storing code for wireless communication at a base station is described. The code may include instructions executable by a processor to determine a pilot signal pattern of a pilot signaling for IQ mismatch estimation for a set of transmit antennas of the base station, transmit pilot signals for each of the set of transmit antennas based on the pilot signal pattern of the pilot signaling, and receive a report including an indication of the estimation of the IQ mismatch for each transmit antenna of the set of transmit antennas of the base station based on the transmitted pilot signals.

In some examples of the method, apparatuses, and non-transitory computer-readable medium described herein, the pilot signal pattern may be based on a number of transmit antennas of the base station.

Some examples of the method, apparatuses, and non-transitory computer-readable medium described herein may further include operations, features, means, or instructions for transmitting configuration signaling that configures the pilot signal pattern for each of the set of transmit antennas of the base station.

In some examples of the method, apparatuses, and non-transitory computer-readable medium described herein, the configuration signaling includes a period associated with the pilot signaling.

Some examples of the method, apparatuses, and non-transitory computer-readable medium described herein may further include operations, features, means, or instructions for determining the period associated with the pilot signaling based on a number of the set of transmit antennas, a number of transmit antennas associated with the pilot signals per symbol, a number of symbols between symbols conveying the pilot signals, a symbol offset value relative to a staring symbol, or a combination thereof.

In some examples of the method, apparatuses, and non-transitory computer-readable medium described herein, the pilot signal pattern extends over a bandwidth for a receiving UE.

In some examples of the method, apparatuses, and non-transitory computer-readable medium described herein, the pilot signal pattern may be symmetric over a bandwidth allocation.

In some examples of the method, apparatuses, and non-transitory computer-readable medium described herein, the pilot signal pattern may be symmetric with respect to a frequency bin associated with the bandwidth allocation.

In some examples of the method, apparatuses, and non-transitory computer-readable medium described herein, the frequency bin corresponds to a center frequency of the bandwidth allocation.

A method of wireless communication at a UE is described. The method may include receiving pilot signaling associated with IQ mismatch estimation for a set of antennas of a base station; and transmitting a report including an indication of an estimation of an IQ mismatch for each antenna of the set of antennas of the base station.

An apparatus for wireless communication is described. The apparatus may include a processor, memory coupled with the processor, the processor configured to receive pilot signaling associated with IQ mismatch estimation for a set of antennas of a base station; and transmit a report including an indication of an estimation of an IQ mismatch for each antenna of the set of antennas of the base station.

Another apparatus for wireless communication is described. The apparatus may include means for receiving pilot signaling associated with IQ mismatch estimation for a set of antennas of a base station; and means for transmitting a report including an indication of an estimation of an IQ mismatch for each antenna of the set of antennas of the base station.

A non-transitory computer-readable medium storing code for wireless communication at a UE is described. The code may include instructions executable by a processor to receive pilot signaling associated with IQ mismatch estimation for a set of antennas of a base station; and transmit a report including an indication of an estimation of an IQ mismatch for each antenna of the set of antennas of the base station.

Some examples of the method, apparatuses, and non-transitory computer-readable medium described herein may further include operations, features, means, or instructions for measuring pilot signals for each of the set of antennas based on a pilot signal pattern of the pilot signaling, and calculating the estimation of the IQ mismatch for each antenna of the set of antennas of the base station based on measuring the pilot signals.

Some examples of the method, apparatuses, and non-transitory computer-readable medium described herein may further include operations, features, means, or instructions for receiving configuration signaling that configures the pilot signal pattern for each of the set of antennas of the base station.

In some examples of the method, apparatuses, and non-transitory computer-readable medium described herein, the configuration signaling includes a period associated with the pilot signaling.

In some examples of the method, apparatuses, and non-transitory computer-readable medium described herein, the pilot signal pattern extends over a bandwidth for the UE.

In some examples of the method, apparatuses, and non-transitory computer-readable medium described herein, the pilot signal pattern may be symmetric over a bandwidth allocation.

In some examples of the method, apparatuses, and non-transitory computer-readable medium described herein, the pilot signal pattern may be symmetric with respect to a frequency bin associated with the bandwidth allocation.

In some examples of the method, apparatuses, and non-transitory computer-readable medium described herein, the frequency bin corresponds to a center frequency of the bandwidth allocation.

Some examples of the method, apparatuses, and non-transitory computer-readable medium described herein may further include operations, features, means, or instructions for determining an estimation of a signal-to-noise ratio (SNR) for each of the set of antennas of the base station based on the pilot signal pattern of the pilot signaling.

Some examples of the method, apparatuses, and non-transitory computer-readable medium described herein may further include operations, features, means, or instructions for determining an estimation of a channel for each of the set of antennas of the base station based on the pilot signal pattern of the pilot signaling, and where calculating the estimation of the IQ mismatch for each antenna of the set of antennas of the base station may be based on the estimation of the channel.

A method of wireless communication at a base station is described. The method may include transmitting pilot signals for each of a set of antennas based on a pilot signal pattern of a pilot signaling, and receiving a report including an indication of or information about an estimation of an IQ mismatch for each antenna of the set of antennas of the base station based on the transmitted pilot signals.

An apparatus for wireless communication is described. The apparatus may include a processor, memory coupled with the processor, the processor configured to transmit pilot signals for each of a set of antennas based on a pilot signal pattern of a pilot signaling, and receive a report including an indication of or information about an estimation of an IQ mismatch for each antenna of the set of antennas of the base station based on the transmitted pilot signals.

Another apparatus for wireless communication is described. The apparatus may include means for transmitting pilot signals for each of a set of antennas based on a pilot signal pattern of a pilot signaling, and means for receiving a report including an indication of or information about an estimation of an IQ mismatch for each antenna of the set of antennas of the base station based on the transmitted pilot signals.

A non-transitory computer-readable medium storing code for wireless communication at a base station is described. The code may include instructions executable by a processor to transmit pilot signals for each of a set of antennas based on a pilot signal pattern of a pilot signaling, and receive a report including an indication of or information about an estimation of an IQ mismatch for each antenna of the set of antennas of the base station based on the transmitted pilot signals.

Some examples of the method, apparatuses, and non-transitory computer-readable medium described herein may further include operations, features, means, or instructions for determining the pilot signal pattern of the pilot signaling for the IQ mismatch estimation for the set of antennas of the base station.

In some examples of the method, apparatuses, and non-transitory computer-readable medium described herein, the pilot signal pattern may be based on a number of antennas of the base station.

Some examples of the method, apparatuses, and non-transitory computer-readable medium described herein may further include operations, features, means, or instructions for transmitting configuration signaling that configures the pilot signal pattern for each of the set of antennas of the base station.

In some examples of the method, apparatuses, and non-transitory computer-readable medium described herein, the configuration signaling includes a period associated with the pilot signaling.

Some examples of the method, apparatuses, and non-transitory computer-readable medium described herein may further include operations, features, means, or instructions for determining the period associated with the pilot signaling based on a number of the set of antennas, a number of antennas associated with the pilot signals per symbol, a number of symbols between symbols conveying the pilot signals, a symbol offset value relative to a staring symbol, or a combination thereof.

In some examples of the method, apparatuses, and non-transitory computer-readable medium described herein, the pilot signal pattern extends over a bandwidth for a receiving UE.

In some examples of the method, apparatuses, and non-transitory computer-readable medium described herein, the pilot signal pattern may be symmetric over a bandwidth allocation.

In some examples of the method, apparatuses, and non-transitory computer-readable medium described herein, the pilot signal pattern may be symmetric with respect to a frequency bin associated with the bandwidth allocation.

In some examples of the method, apparatuses, and non-transitory computer-readable medium described herein, the frequency bin corresponds to a center frequency of the bandwidth allocation.

DETAILED DESCRIPTION

Figure 1:
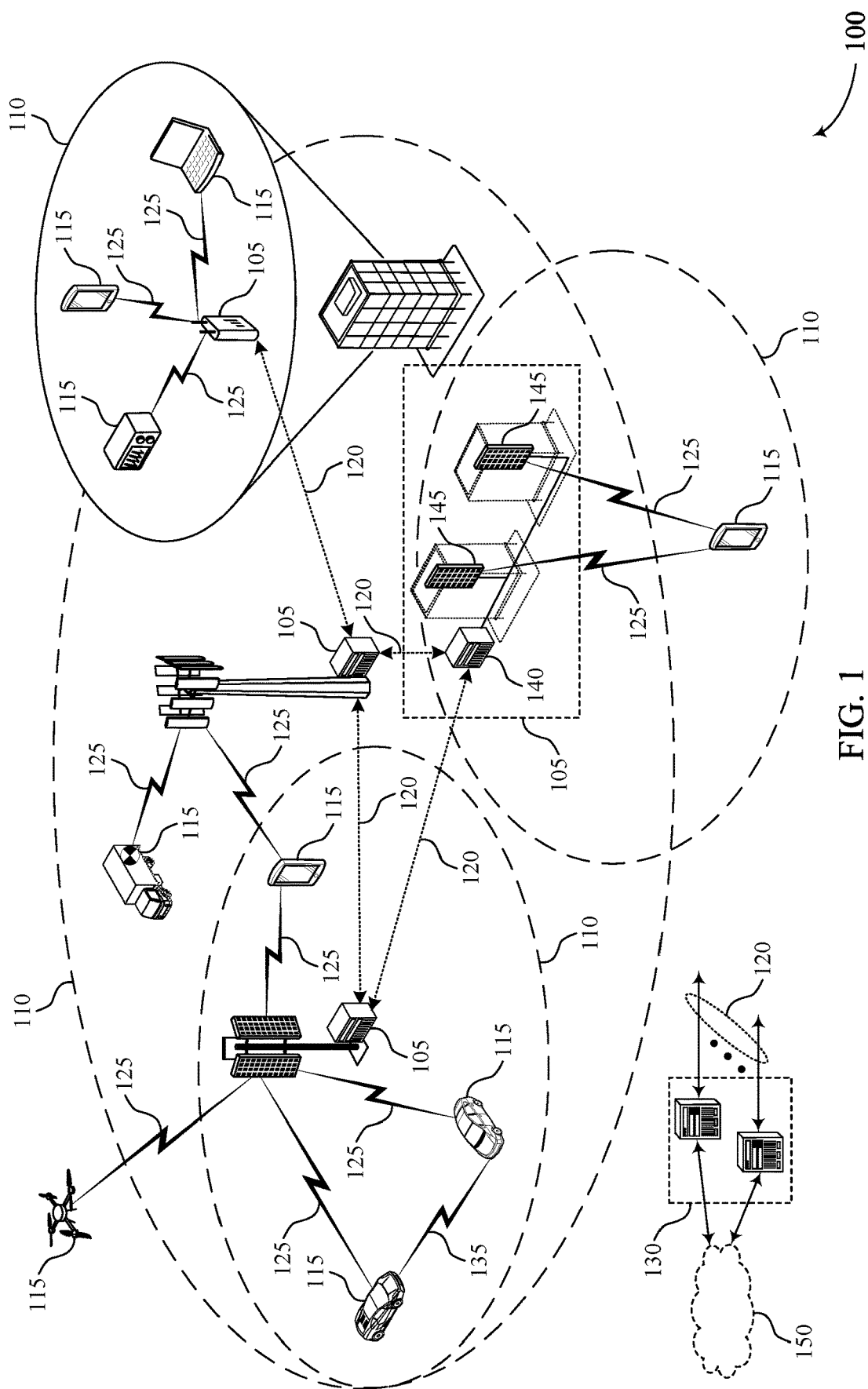
FIGS. 1 and 2 illustrate examples of wireless communications systems that support inphase and quadrature (IQ) mismatch estimation pilot signaling in accordance with aspects of the present disclosure.

Wireless communications systems may include multiple communication devices such as user equipment (UE) and base stations, which may provide wireless communication services to the UE. For example, such base stations may be next-generation NodeBs or giga-NodeBs (either of which may be referred to as a gNB) that may support multiple radio access technologies including fourth generation (4G) systems, such as Long Term Evolution (LTE) systems, as well as fifth generation (5G) systems, which may be referred to as new radio (NR) systems. Some wireless communications systems, such as 4G and 5G systems, may experience an in-phase and quadrature-phase (IQ) mismatch (also referred to as an IQ imbalance), which may impact wireless communications between communication devices. An IQ mismatch may include a mismatch of a gain or a phase between an in-phase and a quadrature-phase of a signal (e.g., an uplink signal, a downlink signal).

Examples of contributing factors to mismatch of a gain or a phase between the in-phase and the quadrature-phase of a signal may include radio frequency mixers (e.g., having different gains for the in-phase paths and the quadrature-phase paths), or phased-locked loops (e.g., that are responsible to generate quadrature local oscillators produces non-equal in-phase and quadrature-phase signals in terms of phase shift), or both. Therefore, an IQ mismatch may pose a challenge on performance of the wireless communications systems by decreasing reliability and increasing latency for wireless communications between communication devices. As demand for wireless communication efficiency increases, various aspects of the present disclosure may provide improvements to IQ mismatch estimation to support higher reliability and lower latency wireless communications, among other examples.

A UE may be configured to support IQ mismatch estimation based on pilot signaling from a base station. For example, the UE may be configured to receive pilot signaling associated with IQ mismatch estimation for a set of antennas (also referred to as transmit antennas or receive antennas, or transmit/receive antennas) of the base station. The UE may measure pilot signals for each of the set of antennas based on a pilot signal pattern of the pilot signaling. The pilot signal pattern may extend over the entire bandwidth seen by the UE. In some examples, the pilot signal pattern may be symmetric over a bandwidth allocation. For example, the pilot signal pattern may be symmetric with respect to a frequency bin associated with the bandwidth allocation. The UE may calculate an estimation of IQ mismatch for each antenna of the set of antennas of the base station based on measuring the pilot signals, and transmit a report including an indication of the estimation of the IQ mismatch for each antenna of the set of antennas of the base station. The base station may receive the report including an estimation of the IQ mismatch, and perform an IQ mismatch correction. As a result, the base station and the UE may support higher accuracy for IQ mismatch correction in wireless communications systems experiencing IQ mismatch.

Aspects of the subject matter described in this disclosure may be implemented to realize one or more of the following potential improvements, among others. The techniques employed by UEs may provide benefits and enhancements to the operation of the UEs. For example, operations performed by the UEs may provide improvements to wireless communications. In some examples, configuring the UEs to support IQ mismatch estimation and feedback may support improvements to power consumption, spectral efficiency, and, in some examples, may promote enhanced efficiency for wireless communications operations, among other benefits.

Aspects of the disclosure are initially described in the context of wireless communications systems. Aspects of the disclosure are further illustrated by and described with reference to apparatus diagrams, system diagrams, and flowcharts that relate to IQ mismatch estimation pilot signaling.

FIG. 1 illustrates an example of a wireless communications system 100 that supports IQ mismatch estimation pilot signaling in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). The wireless communications system 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be configured to support IQ mismatch estimation based on pilot signaling from a base station 105. For example, the UE 115 may be configured to receive pilot signaling associated with IQ mismatch estimation for a set of antennas of the base station 105. The UE 115 may measure pilot signals for each of the set of antennas based on a pilot signal pattern of the pilot signaling. The pilot signal pattern may extend over a bandwidth for the UE 115. In some examples, the pilot signal pattern may be symmetric over a bandwidth allocation. For example, the pilot signal pattern may be symmetric with respect to a frequency bin (e.g., a center frequency bin or DC frequency bin) associated with the bandwidth allocation.

The UE 115 may calculate an estimation of IQ mismatch for each antenna of the set of antennas of the base station 105 based on measuring the pilot signals, and transmit a report including an indication of the estimation of the IQ mismatch for each antenna of the set of antennas of the base station 105. The base station 105 may receive the report including an estimation of the IQ mismatch, and perform an IQ mismatch correction. As a result, the base station 105 and the UE 115 may support higher accuracy for IQ mismatch correction in the wireless communications system 100 when experiencing IQ mismatch.

Figure 2:
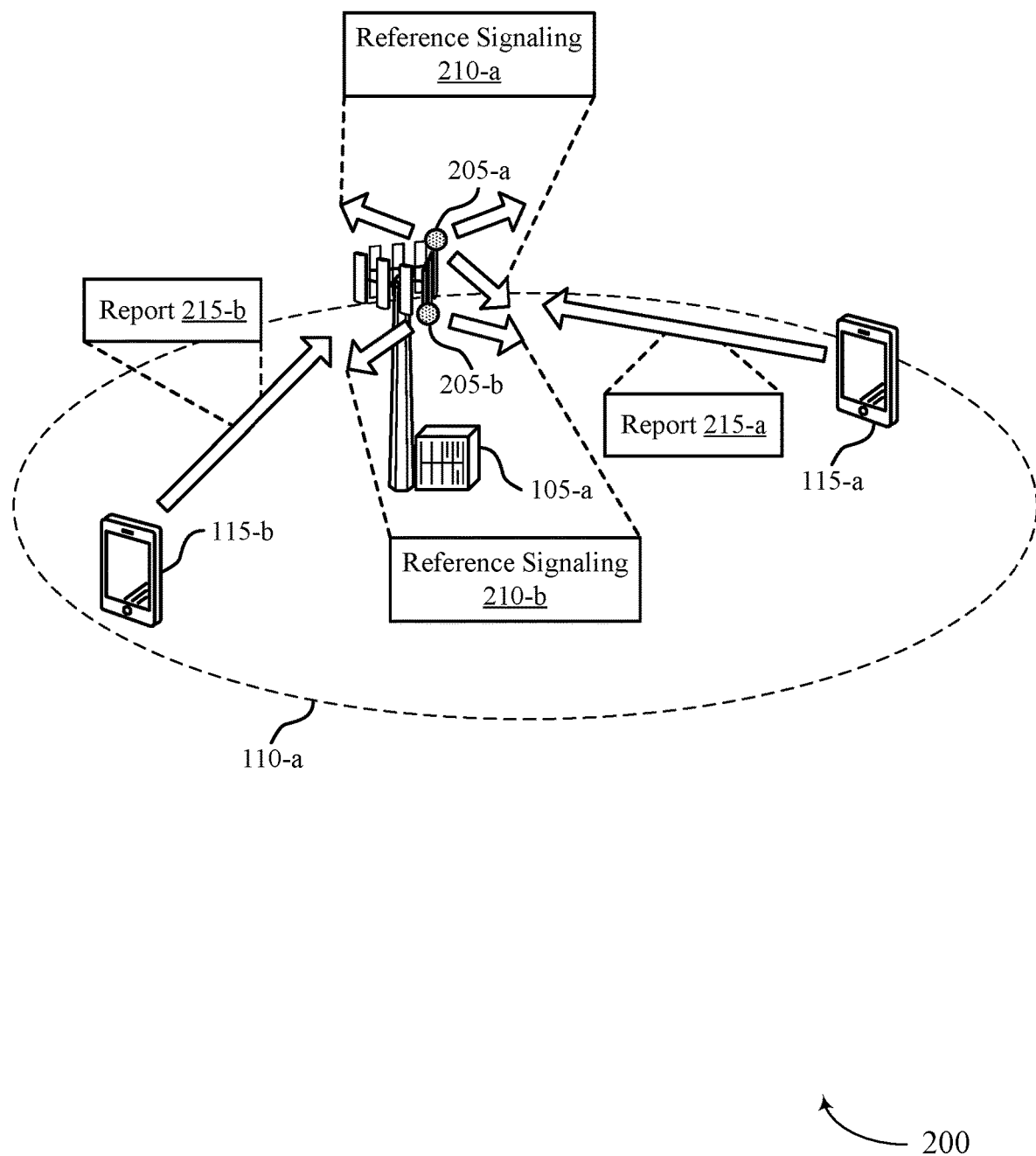

FIG. 2 illustrates an example of a wireless communications system 200 that supports IQ mismatch estimation pilot signaling in accordance with aspects of the present disclosure. In some examples, the wireless communications system 200 may implement aspects of the wireless communications system 100. For example, the wireless communications system 200 may include a base station 105-a and UEs 115-a and 115-b, which may be examples of a base station 105 and UEs 115 as described with reference to FIG. 1. The base station 105-a may serve geographic coverage area 110-a. The base station 105-a may include a number of antennas 205 (e.g., transmit antennas, receive antennas, or any combination thereof) for transmitting signals to the UEs 115 (e.g., on a downlink channel). Each antenna 205 may correspond to a physical antenna, a logical antenna port, an antenna array, a component of an antenna array, or some combination thereof. In some cases, transmissions from the antennas 205 may experience IQ mismatch (e.g., based on the receiver chains at the UEs 115 and the in-phase signal path, the quadrature signal path, or both for the transmissions). Such an IQ mismatch at the base station antennas 205 may set a noise floor for the receiving UEs 115, reducing the reliability of successful reception for specific messages, such as messages corresponding to relatively high modulation and coding scheme (MCS) values, messages corresponding to multiple streams using MIMO, or other similar messages. To correct for the IQ mismatch, the wireless communications system 200 may support IQ mismatch estimation for the base station antennas 205 at the UEs 115.

In some other systems, the base station 105-a may perform IQ mismatch estimation. For the base station 105-a to support IQ mismatch estimation, the base station 105-a may implement a number of hardware components, software components, or a combination thereof per antenna (e.g., per transmit antenna). Such a base station configuration may result in increased processing complexity and overhead at the base station 105-a in order to support local feedback and estimation of IQ mismatch for each antenna at the base station 105-a.

In contrast, as described herein, the wireless communications system 200 may support IQ mismatch estimation and reporting by one or more UEs 115. In some examples, the base station 105-a may transmit reference signaling 210 associated with IQ mismatch estimation for a set of antennas 205. As illustrated, the base station 105-a may transmit reference signaling 210-a using a first antenna 205-a and reference signaling 210-b using a second antenna 205-b. In some cases, the reference signaling 210 may include IQ mismatch pilot signals. UEs 115 may receive the reference signaling 210 and may perform IQ mismatch estimation based on the reference signaling 210. In some examples, UE 115-a may receive reference signaling 210-a and 210-b. UE 115-a may calculate an estimation of an IQ mismatch for each antenna 205 of the set of antennas 205 based on the reference signaling 210. For example, UE 115-a may calculate an IQ mismatch estimation for antenna 205-a based on the reference signaling 210-a and an IQ mismatch estimation for antenna 205-b based on the reference signaling 210-b. Each IQ mismatch estimation may include a gain mismatch estimation (e.g., for a specific frequency range), a phase mismatch estimation (e.g., for the specific frequency range), or both. UE 115-b may perform similar estimation processes. Based on different channel conditions over which UE 115-a and UE 115-b receive the reference signaling 210, the UEs 115 may calculate different IQ mismatch estimations for a same antenna 205.

The UEs 115 may provide feedback to the base station 105-a indicating the IQ mismatch estimations. In some examples, a UE 115 may transmit one or more reports 215 including IQ mismatch estimation information (e.g., IQ mismatch reports). Additionally, the reports 215 may include one or more signal measurements (e.g., for each antenna 205, for specific frequency ranges). Such a signal measurement may be an example of a signal to noise ratio (SNR), a signal to interference-plus-noise ratio (SINR), or some similar signal measurement. In some cases, a report 215 may include the IQ mismatch estimation information for a specific antenna 205. In some other cases, the UE 115 may bundle the reports 215, such that a transmitted feedback message includes reports for a set of antennas 205. UE 115-*a* may transmit report 215-*a* and UE 115-*b* may transmit report 215-*b* (e.g., via a physical uplink shared channel (PUSCH) or another uplink channel).

The base station 105-*a* may receive the reports 215 from a number of UEs 115 and may perform an IQ mismatch correction for each antenna 205 of the set of antennas 205 based on the reports 215. In some cases, the base station 105-*a* may weight the IQ mismatch estimations for the different reports 215 when performing the IQ mismatch correction, for example, based on the reported signal measurements (e.g., SNR values). Weighting the reports 215 may improve the IQ mismatch estimation accuracy (e.g., by reducing the effects of outlier IQ mismatch estimations due to relatively poor SNR values). Furthermore, by combining the information from the reports (e.g., from multiple UEs 115), the base station 105-*a* may improve the IQ mismatch estimation accuracy (e.g., as compared to performing the correction based on a single device's estimation). In some examples, report 215-*a* may include an indication of the estimation of the IQ mismatch for antenna 205-*a* by UE 115-*a*, and report 215-*b* may include an indication of the estimation of the IQ mismatch for antenna 205-*a* by UE 115-*b*. The base station 105-*a* may perform IQ mismatch correction for antenna 205-*a* based on both the report 215-*a* and the report 215-*b*. Using such information, the base station 105-*a* may apply a correction per transmission (e.g., from antenna 205-*a*) to improve the transmission error vector magnitude (EVM) for base station 105-*a*.

Performing IQ mismatch estimation and reporting at the UEs 115 may reduce the IQ mismatch noise floor and improve IQ mismatch estimation. Specifically, the base station 105-*a* may reduce the IQ mismatch noise floor for a set of UEs 115 based on the feedback information from one UE 115 or a subset of UEs 115. For example, if the base station 105-*a* receives report 215-*a* but not report 215-*b*, the base station 105-*a* may perform IQ mismatch correction for transmissions to both UE 115-*a* and UE 115-*b* based on report 215-*a*. In this way, even if UE 115-*b* does not support IQ mismatch reporting (e.g., if UE 115-*b* is a legacy UE), UE 115-*b* may benefit from the IQ mismatch reporting of other UEs 115 in the wireless communications system 200. Additionally or alternatively, performing IQ mismatch estimation and reporting at the UEs 115 may reduce the complexity at the base station 105.

For example, the base station 105-*a* may refrain from performing IQ mismatch estimation locally for each antenna 205 and, as such, may refrain from implementing the corresponding hardware components, software components, or combination thereof per antenna 205. In some cases, due to the base station 105-*a* performing an accurate IQ mismatch correction for transmissions based on the reports 215, UEs 115 may refrain from performing IQ mismatch estimation and correction (e.g., across a full bandwidth for a UE 115) for specific messages received from the base station 105-*a*. In some cases, the UEs 115 may perform IQ mismatch estimation at specific resources for further improvements (e.g., as opposed to across the full bandwidth). Additionally or alternatively, the base station 105-*a* may allocate multiple UEs 115 at different frequencies concurrently (e.g., even for relatively high MCS values above an MCS threshold), enabling orthogonal frequency division multiple access (OFDMA) support. Accordingly, as described herein, supporting IQ mismatch estimation and reporting at UEs 115 may improve reception reliability and capacity at the UEs 115 while reducing complexity at the base station 105-*a*.

Figure 3:
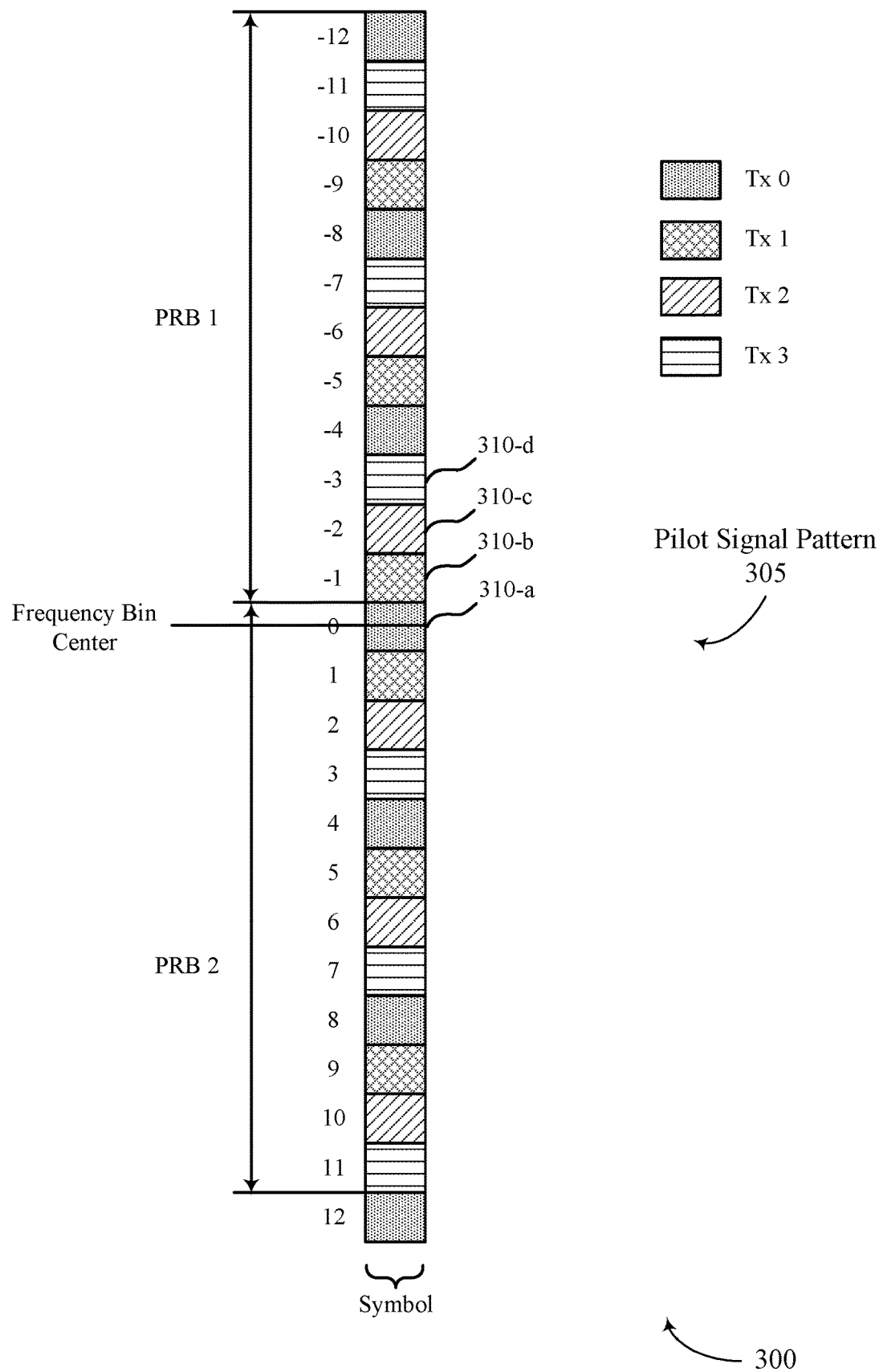
FIGS. 3 and 4 illustrate examples of pilot signaling diagrams that support IQ mismatch estimation pilot signaling in accordance with aspects of the present disclosure.

FIG. 3 illustrates an example of a pilot signaling diagram 300 that supports IQ mismatch estimation pilot signaling in accordance with aspects of the present disclosure. In some examples, pilot signaling diagram 300 may implement aspects of the wireless communications system 100 and/or the wireless communications system 200. In some examples, the pilot signaling diagram 300 may include an example pilot signal pattern 305 including a plurality of pilot signals 310 transmitted from a base station 105 to a UE 115 via a plurality of antennas of the base station 105. In some aspects, the pilot signal pattern 305 may enable estimation of IQ mismatch for the plurality of antennas of the base station 105. In particular, the pilot signal pattern 305 may enable a UE 115 receiving pilot signaling including the pilot signal pattern 305 to estimate IQ mismatch associated with the plurality of the antennas of the base station 105.

The base station 105 may, in some examples, be configured to determine the pilot signal pattern 305 of the pilot signaling to be used. The pilot signal pattern 305 may be associated with one or more antennas of a plurality of antennas of a base station 105. For example, as shown in FIG. 3, the pilot signal pattern 305 may include pilot signals 310-*a* associated with (e.g., transmitted by) a first antenna (e.g., Tx 0), pilot signals 310-*b* associated with a second antenna (e.g., Tx 1), pilot signals 310-*c* associated with a third antenna (e.g., Tx 2), and pilot signals 310-*d* associated with a fourth antenna (e.g., Tx 3) of the base station 105. While the pilot signal pattern 305 is shown and described in FIG. 3 as including pilot signals 310-*a*, 310-*b*, 310-*c*, 310-*d* associated with four antennas, this is not to be regarded as a limitation of the present disclosure, unless noted otherwise herein. In this regard, the pilot signal pattern 305 may be determined (e.g., determined by the base station 105) to include pilot signals 310 associated with any number of antennas.

In some examples, the pilot signal pattern 305 may be included within a single OFDM symbol. In this regard, the "width" of the pilot signal pattern 305 may correspond to an OFDM symbol, and the pilot signal pattern 305 may be conveyed within a single symbol (e.g., OFDM symbol). Accordingly, the pilot signal pattern 305 may be repeated at a plurality of symbols within a given timeframe. As will be described in further detail herein, pilot signaling may include multiple symbols conveying the pilot signaling pattern 305 (or similar pilot signaling patterns). For example, the pilot signal pattern 305 may be extended across one or more physical resource block (PRB) defining a bandwidth allocation observed by the UE 115. The plurality of pilot signals 310-*a*, 310-*b*, 310-*c*, 310-*d* associated with the plurality of antennas may be transmitted via a plurality of subcarriers. For example, in the context of 5G communications, a PRB may include twelve subcarriers, as shown in FIG. 3. In this example, a first PRB (e.g., PRB 1) may include twelve pilot signals 310, where each pilot signal of the first PRB is conveyed via a single subcarrier of the first PRB. Similarly, a second PRB (e.g., PRB 2) may include twelve pilot signals 310, where each pilot signal of the second PRB is conveyed via a single subcarrier of the second PRB. A single PRB may include varying numbers of subcarriers (and therefore varying numbers of pilot signals 310) depending on the characteristics of a given wireless communications network (e.g., the wireless communications system 100 and the wireless communications system 200).

In some aspects, the pilot signal pattern 305 may be extended over at least a portion of the bandwidth allocation observed by the UE 115. In some cases, the pilot signal pattern 305 may be extended over the entire bandwidth allocation. For example, as shown in FIG. 3, the pilot signal pattern 305 may include pilot signals 310-*a*, 310-*b*, 310-*c*, 310-*d* associated with the various antennas (e.g., Tx 0, Tx 1, Tx 2, Tx 3) such that each a sequence of the pilot signals 310-*a*, 310-*b*, 310-*c*, 310-*d* is extended across the various subcarriers of the bandwidth allocation. For instance, when moving from the first subcarrier of PRB 1 (e.g., Subcarrier −1) toward the twelfth subcarrier of PRB 1 (e.g., Subcarrier −12), each pilot signal 310-*a*, 310-*b*, 310-*c*, 310-*d* of the pilot signal pattern 305 may be occur every fourth pilot signal (e.g., every fourth subcarrier), such that there are three pilot signals 310 between each recurrence of the respective pilot signal 310-*a*, 310-*b*, 310-*c*, 310-*d*.

In some aspects, the pilot signal pattern 305 may include a sequence in which each element of the sequence is located/positioned at a different resource element of a antenna. For example, in some aspects, the elements of the pilot signal pattern 305 (e.g., pilot sequence) associated with the first antenna (e.g., Tx 0) may be located at the resource elements associated with the first antenna. For instance, the elements of the pilot sequence of Tx 0 (e.g., [ . . . , p0(n), p0(n+1), p0(n+2), p0(n+3), p0(n+4), p0(n+5) . . . ] may be located at the resource elements of Tx 0 (e.g., [ . . . , −12, −8, −4, 0, 4, 8, 12, . . . ]), where p0(n) is the pilot sequence for Tx 0.

In some aspects, the sequence of the pilot signal pattern 305 may be extended over the entire bandwidth allocation associated with the pilot signaling. In this regard, the pilot signal pattern 305 may span multiple frequencies (e.g., multiple subcarriers) and multiple frequency bins within the bandwidth allocation. In some aspects, the pilot signal pattern 305 may be symmetric over the bandwidth allocation. In some cases, the pilot signal pattern 305 may be symmetric with respect to a frequency bin associated with the bandwidth allocation. In some aspects, the pilot signal pattern 305 may be symmetric with respect to a frequency bin associated with the bandwidth allocation, where the frequency bin corresponds to a center frequency of the bandwidth allocation.

For example, as shown in FIG. 3, the pilot signal pattern 305 may be symmetric with respect to a frequency bin center of a frequency bin associated with the bandwidth allocation. The frequency bin illustrated in FIG. 3 may correspond to a center frequency of the bandwidth allocation (e.g., a DC bin) such that the frequency bin center corresponds to the center of the bandwidth allocation. In some aspects, the pilot signal pattern 305 may be centered on the frequency bin center of the frequency bin, where the sequence of the pilot signal pattern 305 is then symmetric about the pilot signal 310 centered on the frequency bin center. For instance, as shown in FIG. 3, a pilot signal 310-*a* associated with the first antenna (Tx 0) may be centered on the frequency bin center at Subcarrier 0. The repeating pilot signal pattern may then be based upon the pilot signal 310-*a* centered at the frequency bin center. In this regard, Subcarrier 1 and Subcarrier −1 may convey pilot signals 310-*b* associated with the second antenna (Tx 1), Subcarrier 2 and Subcarrier −2 may convey pilot signals 310-*c* associated with the third antenna (Tx 3), and Subcarrier 3 and Subcarrier −3 may convey pilot signals 310-*d* associated with the fourth antenna (Tx 3).

Continuing with the same example above, in some aspects, the sequence of the pilot signal pattern 305 may then symmetric about frequency bin center. For example, Subcarriers 0, 4, −4, 8, −8, 12, and −12 may convey pilot signals 310-*a* associated with the first antenna (Tx 0), Subcarriers 1, −1, 5, −5, 9, and −9, may convey pilot signals 310-*b* associated with the second antenna (Tx 1), Subcarriers 2, −2, 6, −6, 10, and −10, may convey pilot signals 310-*c* associated with the third antenna (Tx 2), and Subcarriers 3, −3, 7, −7, 11, and −11, may convey pilot signals 310-*d* associated with the fourth antenna (Tx 3).

In some aspects, the wireless communications system 100 and the wireless communications system 200 may utilize pilot signaling illustrated by the pilot signaling diagram 300 to estimate IQ mismatch for one or more antennas of a base station 105 within the wireless communications system 100, 200. For example, the base station 105 may be configured to determine the pilot signal pattern 305. The base station 105 may transmit configuration signaling (e.g., downlink control information (DCI)) to the UE 115 which configures the pilot signal pattern 305 for each of the plurality of antennas of the base station 105. In this regard, the configuration signaling may include information associated with one or more characteristics of the pilot signal pattern. Subsequently, the base station 105 may transmit pilot signaling to one or more UEs 115 in accordance with the pilot signal pattern 305. A UE 115 of the one or more UEs 115 may then measure the pilot signals 310-*a*, 310-*b*, 310-*c*, 310-*d* for one or more of the antennas based on the pilot signal pattern 305. In some aspects, the UE 115 may then calculate an estimation of IQ mismatch for the one or more antennas of the base station 105 based on the measurement of the pilot signals 310-*a*, 310-*b*, 310-*c*, 310-*d* within the pilot signal pattern 305. In some aspects, the UE 115 may transmit a report (e.g., IQ mismatch report) to the base station including an indication of estimated IQ mismatch for one or more antennas of the base station 105. In this regard, the base station 105 may be configured to receive one or more IQ mismatch reports from the one or more UEs 115 in order to correct or otherwise address the determined IQ mismatch for the base station 105.

Figure 4:
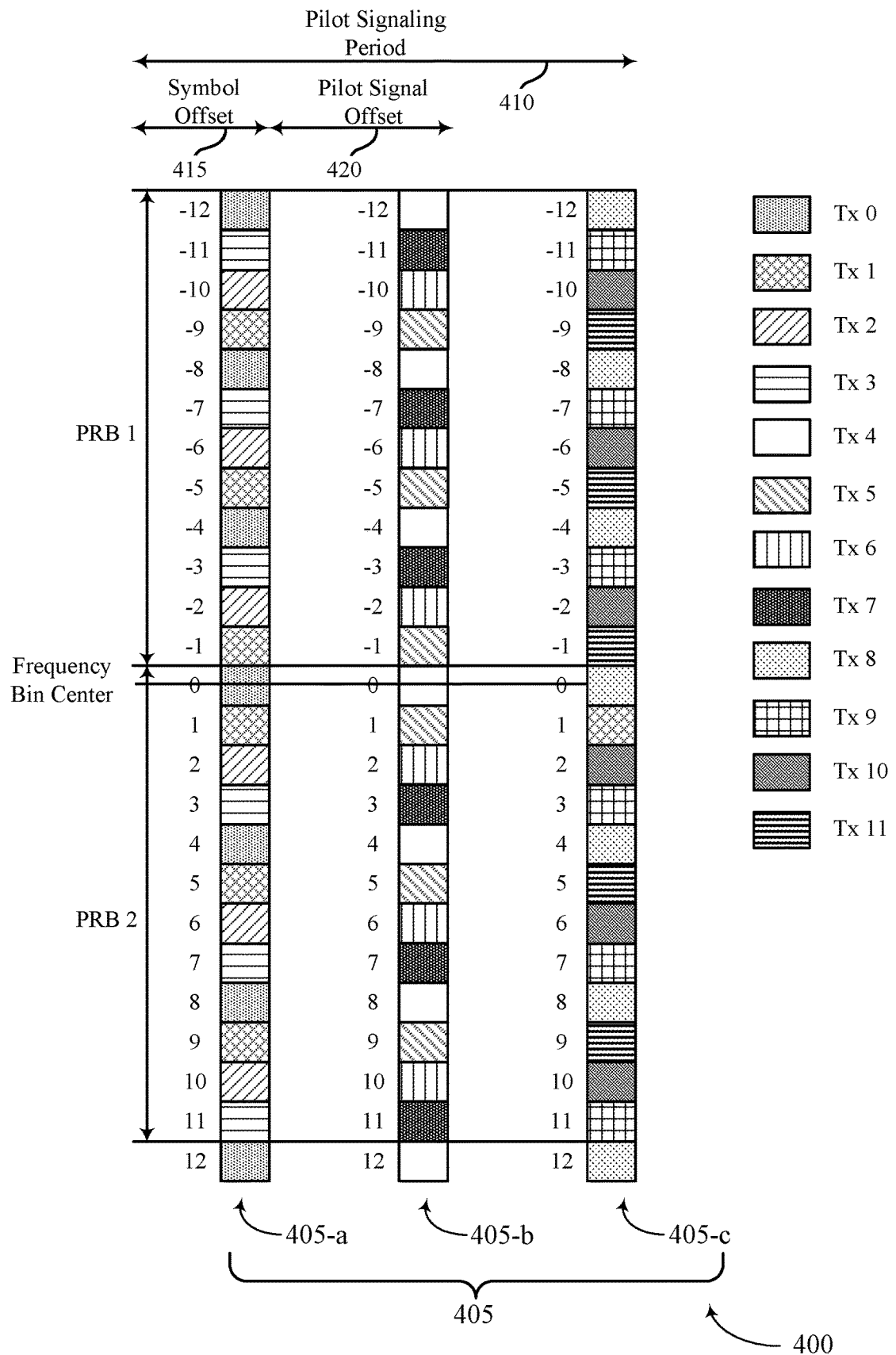

FIG. 4 illustrates an example of a pilot signaling diagram 400 that supports IQ mismatch estimation pilot signaling in accordance with aspects of the present disclosure. In some examples, pilot signaling diagram 400 may implement aspects of wireless communications system 100, wireless communications system 200, and/or pilot signaling diagram 300. In some aspects, the pilot signaling diagram 400 illustrates an example of pilot signaling including a first pilot signal pattern 405-*a*, a second pilot signal pattern 405-*b*, and a third pilot signal pattern 405-*c*. In some aspects, the pilot signal patterns 405-*a*, 405-*b*, 405-*c* may enable estimation of IQ mismatch for the plurality of antennas of the base station 105.

As noted previously herein with respect to FIG. 3, each pilot signal pattern 405-*a*, 405-*b*, 405-*c* may be associated with a plurality of antennas of a base station 105. For example, the first pilot signal pattern 405-*a* may include pilot signals be associated with a first antenna (e.g., Tx 0), a second antenna (e.g., Tx 1), a third antenna (e.g., Tx 2), and a fourth antenna (e.g., Tx 3) of a base station 105. Similarly, the second pilot signal pattern 405-*b* may include pilot signals be associated with a fifth antenna (e.g., Tx 4), a sixth antenna (e.g., Tx 5), a seventh antenna (e.g., Tx 6), and an eighth antenna (e.g., Tx 7) of the base station 105. Furthermore, the third pilot signal pattern 405-*c* may include pilot signals be associated with a ninth antenna (e.g., Tx 8), a tenth antenna (e.g., Tx 9), an eleventh antenna (e.g., Tx 10), and a twelfth antenna (e.g., Tx 11) of the base station 105.

In some aspects, the first pilot signal pattern 405-*a*, the second pilot signal pattern 405-*b*, and the third pilot signal pattern 405-*c* may collectively be referred to as "a single pilot signal pattern 405" which characterizes the pilot signaling used for IQ mismatch estimation. Any discussion associated with the pilot signal pattern 305 illustrated in FIG. 3 may be regarded as applying to the pilot signal patterns 405-*a*, 405-*b*, 405-*c* illustrated in FIG. 4, unless noted otherwise herein. In this regard, the pilot signal patterns 405-*a*, 405-*b*, 405-*c* may be extended over at least a portion of the bandwidth allocation observed by the UE 115. For example, in some aspects, the pilot signal patterns 405-*a*, 405-*b*, 405-*c* may include pilot signal pattern sequences which are extended across at least a portion of the bandwidth allocation. In some aspects, the pilot signal patterns 405-*a*, 405-*b*, 405-*c* may be symmetric with respect to a frequency bin center of a frequency bin associated with the bandwidth allocation.

In some aspects, each of the pilot signal patterns 405-*a*, 405-*b*, 405-*c* may be included within a single symbol (e.g., OFDM symbol). For example, in some cases, a first OFDM symbol may convey the first pilot signal pattern 405-*a*, a second OFDM symbol may convey the second pilot signal pattern 405-*b*, and a third OFDM symbol may convey the third pilot signal pattern 405-*c*.

In some aspects, the pilot signaling may include a pilot signaling period 410. The pilot signaling period 410 may define a time interval (e.g., number of symbols) over which IQ estimation is to be determined. The pilot signaling period 410 may define a time interval over which symbols (e.g., OFDM symbols) including IQ mismatch pilot signals are transmitted. In some aspects, the pilot signaling period 410 may be defined, at least in part, by a symbol offset 415, where the symbol offset 415 defines a period of time (e.g., number of symbols) between the start of the pilot signaling period 410 and the first symbol (e.g., first OFDM symbol) conveying IQ mismatch pilot signals. For example, as shown in FIG. 4, the symbol offset 415 may define a number of symbols between the start of the pilot signaling period 410 and a first OFDM symbol conveying the pilot signal pattern 405-*a*. The symbol offset 415 may be zero in cases where the first symbol conveying IQ mismatch pilot signals is transmitted as the first symbol within the pilot signaling period 410.

In some aspects, the pilot signaling period 410 may further be defined, at least in part, by a pilot signal offset 420. The pilot signal offset 420 may define a number of symbols (e.g., OFDM symbols) between symbols conveying IQ mismatch pilot signals. For example, as shown in FIG. 4, the pilot signaling may include a first OFDM symbol which conveys the first pilot signal pattern 405-*a*, and a second OFDM symbol which conveys the second pilot signal pattern 405-*b*. In this example, the pilot signal offset 420 may define a number of OFDM symbols between the first OFDM symbol (e.g., OFDM symbol conveying the first pilot signal pattern 405-*a*) and the second OFDM symbol (e.g., OFDM symbol conveying the second pilot signal pattern 405-*b*).

In some aspects, the pilot signal offset 420 may be uniform throughout the pilot signaling, such that each symbol (e.g., OFDM symbol) conveying IQ mismatch pilot signals is separated from adjacent symbols conveying IQ mismatch pilot signals by the same pilot signal offset 420. Additionally or alternatively, the pilot signal offset 420 may not be uniform throughout the pilot signaling. For example, the pilot signaling may include a first OFDM symbol which conveys the first pilot signal pattern 405-*a*, a second OFDM symbol which conveys the second pilot signal pattern 405-*b*, and a third OFDM symbol which conveys the third pilot signal pattern 405-*c*. In this example, the pilot signaling may include a first pilot signal offset 420 separating the first OFDM symbol and the second OFDM symbol, and a second pilot signal offset 420 separating the second OFDM symbol and the third OFDM symbol, where the second pilot signal offset 420 is different from the first pilot signal offset 420.

In some aspects, the base station 105 may be configured to determine a period of the pilot signaling (e.g., pilot signaling period 410) based on any number of characteristics including, but not limited to, the number of antennas of the base station 105, the number of antennas associated with the pilot signals per symbol (e.g., number of antennas associated with each pilot signal pattern 405-*a*, 405-*b*, 405-*c*), the symbol offset 415, the pilot signal offset 420, and the like. For example, in some aspects, the pilot signaling period 410 used for IQ mismatch estimation ($T_{IQ\ mismatch\ PSP}$) may be determined according to Equation (1):

$$T_{IQMismatchPSPeriod} = \left(\left\lceil \frac{N_{Tx}}{N_{TxperOS}} \right\rceil - 1\right) T_{PSOffset} + T_{SymbolOffset} \quad (1)$$

where $N_{Tx}$ defines the number of transmit antennas of the base station 105 for which IQ mismatch is to be estimated, $N_{Tx\ per\ OS}$ defines the number of transmit antennas per symbol (e.g., OFDM symbol) (e.g., number of transmit antennas associated with each pilot signal pattern 405-*a*, 405-*b*, 405-*c*), $T_{PS\ offset}$ defines a number of symbols between symbols conveying the pilot signals (e.g., $T_{PS\ offset}$ defines pilot signal offset 420), and $T_{Symbol\ Offset}$ defines a number of symbols between the start of the pilot signaling period 410 and the first symbol conveying IQ mismatch pilot signals (e.g., $T_{Symbol\ Offset}$ defines symbol offset 415).

In some aspects, the wireless communications system 100 and the wireless communications system 200 may utilize pilot signaling illustrated by the pilot signaling diagram 400 to estimate IQ mismatch for one or more antennas of a base station 105 within the wireless communications system 100, 200. For example, the base station 105 may be configured to determine the first pilot signal pattern 405-*a*, the second pilot signal pattern 405-*b*, and the third pilot signal pattern 405-*c* of the pilot signaling for use in IQ mismatch estimation. In some aspects, the first pilot signal pattern 405-*a*, the second pilot signal pattern 405-*b*, and the third pilot signal pattern 405-*c* may collectively be referred to as a single pilot signaling pattern 405 used for IQ mismatch estimation. The base station 105 may further determine a period associated with the pilot signaling (e.g., pilot signaling period 410). In some aspects, the base station 105 may determine the pilot signaling period 410 based on a number antennas of the base station 105 for which IQ mismatch estimation is to be performed, a number of antennas associated with the pilot signals per symbol, the symbol offset value relative to a starting symbol (e.g., symbol offset 415), a number of symbols between symbols conveying the pilot signals (e.g., pilot signal offset 420), or a combination thereof. For instance, in some cases, the base station 105 may determine the period associated with the pilot signaling (e.g., pilot signaling period 410, $T_{IQ\ Mismatch\ PS\ Period}$) according to Equation (1).

Continuing with the same example, the base station 105 may transmit configuration signaling to one or more UEs 115, where the configuration signaling configures the pilot signal pattern 405 for each of the plurality of antennas of the base station 105. In this regard, the configuration signaling may include indications for various characteristics of the pilot signaling including, but not limited to, the pilot signal pattern 405, the pilot signaling period 410, the symbol offset 415, the pilot signal offset 420, and the like). Subsequently, the base station 105 may transmit pilot signaling to one or more UEs 115 in accordance with the pilot signal pattern 405. A UE 115 of the one or more UEs 115 may then measure the pilot signals for one or more of the antennas based on the pilot signal pattern 405. In some aspects, the UE 115 may then calculate an estimation of IQ mismatch for each antenna of the base station 105 based on the measurement of each of the pilot signals within the pilot signal pattern 405. In some aspects, the UE 115 may transmit reports (e.g., IQ mismatch reports) to the base station 105 including an indication of estimated IQ mismatch for the antennas of the base station 105. In this regard, the base station 105 may be configured to receive one or more IQ mismatch reports from the one or more UEs 115 in order to correct or otherwise address the determined IQ mismatch for the base station 105.

Figure 5:
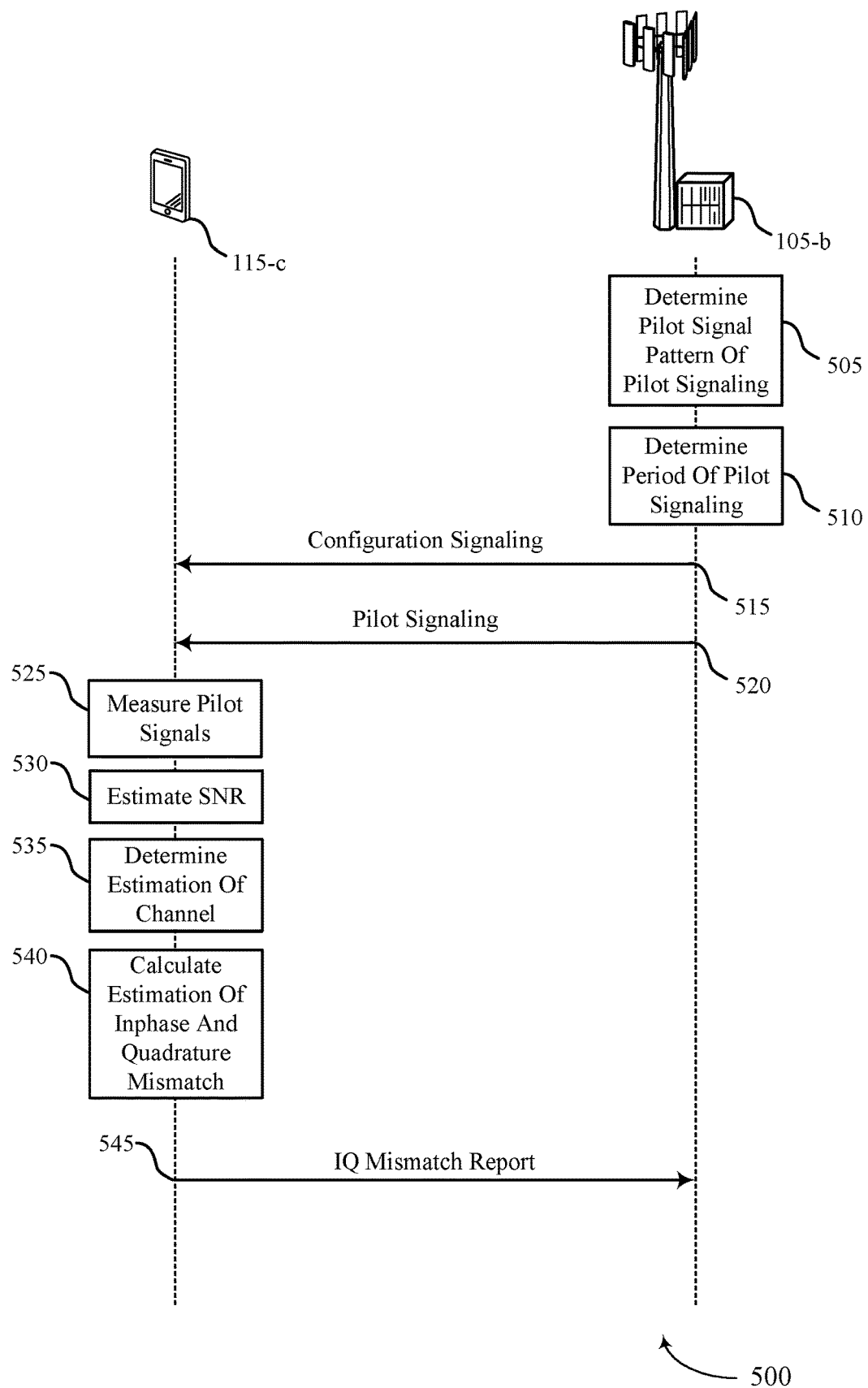
FIG. 5 illustrates an example of a process flow that supports IQ mismatch estimation pilot signaling in accordance with aspects of the present disclosure.

FIG. 5 illustrates an example of a process flow 500 that supports IQ mismatch estimation pilot signaling in accordance with aspects of the present disclosure. In some examples, the process flow 500 may implement aspects of wireless communications system 100, wireless communications system 200, pilot signaling diagram 300, and/or pilot signaling diagram 400. The process flow 500 may illustrate an example of communications between a base station 105-*b* and a UE 115-*c* which enable estimation of IQ mismatch for a plurality of antennas of the base station 105. The base station 105-*b* and the UE 115-*c* may be examples of corresponding devices as described herein. For example, the process flow 500 may illustrate transmitting pilot signaling, measuring pilot signals based on a pilot signal pattern of the pilot signaling, and calculating an estimation of an IQ mismatch for a plurality of antennas based on the measurement of the pilot signals, as described with reference to FIGS. 1-4.

In the following description of the process flow 500, the operations between the base station 105-*b* and the UE 115-*c* may be transmitted in a different order than the example order shown, or the operations performed by the base station 105-*b* and the UE 115-*c* may be performed in different orders or at different times. Some operations may also be omitted from the process flow 500, and other operations may be added to the process flow 500. The operations illustrated in the process flow 500 may be performed by hardware (e.g., including circuitry, processing blocks, logic components, and other components), code (e.g., software or firmware) executed by a processor, or any combination thereof.

At 505, the base station 105-*b* may determine a pilot signaling pattern of a pilot signaling. In some aspects, the base station 105-*b* may determine the pilot signaling pattern for the pilot signaling for IQ mismatch for the plurality of antennas of the base station 105-*b*. In some examples, the base station 105-*b* may be configured to determine the pilot signaling pattern in accordance with the pilot signaling diagrams 300 and 400 illustrated in FIGS. 3 and 4.

In some aspects, the pilot signal pattern may include a pilot signal pattern that is extended over a bandwidth allocation observed by the UE. In some cases, the pilot signal pattern may be extended over the entire bandwidth allocation. In some aspects, the pilot signal pattern may include a sequence which is extended over the bandwidth allocation. In other aspects, the pilot signal pattern may be symmetric over a bandwidth allocation. For example, in some cases, the pilot signal pattern may be symmetric with respect to a frequency bin associated with the bandwidth allocation, as shown in FIGS. 3 and 4. In this example, the frequency bin may correspond to the center frequency of the bandwidth allocation.

At 510, the base station 105-*b* may determine a period associated with the pilot signaling. In some aspects, the period associated with the pilot signaling (e.g., pilot signaling period 410) may be based on any number of characteristics including, but not limited to, a number antennas of the base station 105 for which IQ mismatch estimation is to be performed, a number of antennas associated with the pilot signals per symbol, the symbol offset value relative to a staring symbol (e.g., symbol offset 415), a number of symbols between symbols conveying the pilot signals (e.g., pilot signal offset 420), or a combination thereof. For instance, in some cases, the base station 105 may determine the period associated with the pilot signaling (e.g., pilot signaling period 410, $T_{IQ\ Mismatch\ PS\ Period}$) according to Equation (1).

At 515, the base station 105-*b* may transmit configuration signaling to the UE 115-*c*. In some aspects, the configuration signaling may configure the pilot signal pattern for each of the plurality of antennas of the base station 105-*b*. In this regard, the configuration signaling may include information associated with one or more characteristics of the pilot signal pattern including, but not limited to, a symbol offset 415, a pilot signal offset 420, and the like. For example, the configuration signaling may configure the pilot signal pattern based at least in part on the pilot signal pattern determined at 505. By way of another example, the configuration signaling may configure the pilot signal pattern based at least in part on the period of the pilot signaling (e.g., pilot signaling period 410) determined at 510. In some aspects, the configuration information may include, but is not limited to, DCI. For example, the base station 105-*b* may be configured to transmit DCI to the UE 115-*c*, where the DCI configures the pilot signal pattern for each of the plurality of antennas of the base station 105-*b*.

At 520, the base station 105-*b* may transmit pilot signaling to the UE 115-*c*. The pilot signaling at 520 may be associated with IQ mismatch estimation for the plurality of antennas of the base station 105-*b*. In some aspects, the pilot signaling may be transmitted in accordance with the configuration signaling transmitted at 515. For example, the pilot signaling may be transmitted based at least in part on the pilot signal pattern determined at 505 and/or the period of the pilot signaling determined at 510.

At 525, the UE 115-*c* may measure the pilot signals associated with one or more antennas of the base station 105-*b*. In some aspects, the UE 115-*c* may measure the pilot signals for each of the plurality of antennas of the base station 105-*b*. In some aspects, the UE 115-*c* may measure the pilot signals based at least in part on the pilot signal pattern. For example, the configuration signaling transmitted from the base station 105-*b* to the UE 115-*c* at 515 may include an indication of the pilot signal pattern of the pilot signals. In this regard, the UE 115-*c* may be configured to utilize the pilot signal pattern indicated in the configuration signaling in order to measure the pilot signals at 525.

At 530, the UE 115-*c* may determine an estimation of an SNR for one or more of the antennas of the base station 105-*b*. The UE 115-*c* may be configured to determine the estimation of the SNR based at least in part on the pilot signal pattern of the pilot signaling. In some aspects, the UE 115-*c* may be configured to determine an estimation of an SNR for each antenna of the plurality of antennas of the base station 105-*b*. For example, the IQ mismatch report may include a first SNR value associated with a first antenna of the base station, a second SNR value associated with a second antenna of the base station, and an nth SNR value associated with an nth antenna of the base station.

At 535, the UE 115-*c* may determine an estimation of a channel for one or more of the antennas of the base station 105-*b*. The UE 115-*c* may be configured to determine the estimation of the channel for the plurality of antennas based least in part on the pilot signal pattern of the pilot signaling. In some aspects, the UE 115-*c* may be configured to determine an estimation of a channel for each antenna of the plurality of antennas of the base station 105-*b*. For example, the IQ mismatch report may include a first channel estimation associated with the first antenna of the base station, a second channel estimation associated with the second antenna of the base station, and an nth channel estimation associated with the nth antenna of the base station.

At 540, the UE 115-*c* may calculate an estimation of an IQ mismatch for one or more antennas of the base station 105-*b*. In some aspects, the UE 115-*c* may be configured to determine an estimation the IQ mismatch for each antenna of the plurality of antennas of the base station 105-*b*. The estimation of the IQ mismatch may be based at least in part on the measurements and/or estimations performed on the pilot signals. For example, in some cases, the UE 115-*c* may be configured to estimate the IQ mismatch for one or more antennas of the base station 105-*b* based at least in part on the estimation of the SNR determined at 530. By way of another example, the UE 115-*c* may be configured to estimate the IQ mismatch for one or more antennas of the base station 105-*b* based at least in part on the estimation of the channel determined at 535.

At 545, the UE 115-*c* may transmit, to the base station 105-*b*, a report including an indication of the estimation of the IQ mismatch for one or more antennas of the base station 105-*b* (e.g., "IQ mismatch report"). The IQ mismatch report may be generated and/or transmitted based at least in part on the measurement/estimations of the pilot signals transmitted by the base station 105-*b* at 520. In some cases, the report may include an indication of the estimation of the IQ mismatch for each antenna of the plurality of antennas of the base station 105-*b*. For example, the IQ mismatch report may include a first IQ mismatch value associated with the first antenna of the base station, a second IQ mismatch value associated with the second antenna of the base station, and an nth IQ mismatch value associated with the nth antenna of the base station.

Figure 6:
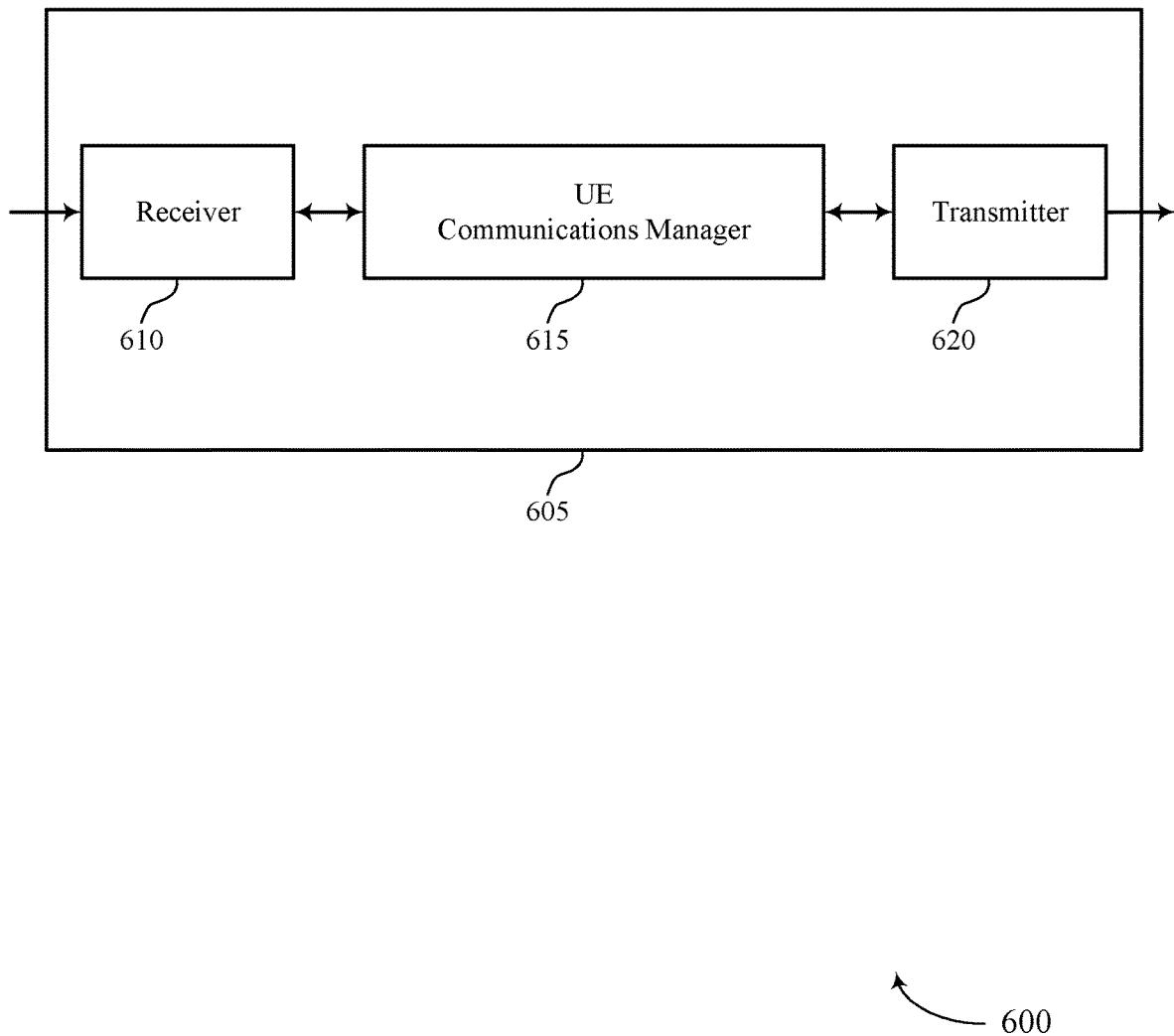
FIGS. 6 and 7 show block diagrams of devices that support IQ mismatch estimation pilot signaling in accordance with aspects of the present disclosure.

FIG. 6 shows a block diagram 600 of a device 605 that supports IQ mismatch estimation pilot signaling in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to IQ mismatch estimation pilot signaling). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive pilot signaling associated with IQ mismatch estimation for a set of antennas of a base station, measure pilot signals for each of the set of antennas based on a pilot signal pattern of the pilot signaling, and calculate an estimation of an IQ mismatch for each antenna of the set of antennas of the base station based on measuring the pilot signals. The UE communications manager 615 may be an example of aspects of the UE communications manager 910 described herein. By including or configuring the UE communications manager 615 in accordance with examples as described herein, the device 605 (e.g., a processor controlling or otherwise coupled to the receiver 610, the transmitter 620, the UE communications manager 615, or a combination thereof) may support techniques for reduced power consumption by improving the reliability and reducing latency of wireless communications as described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
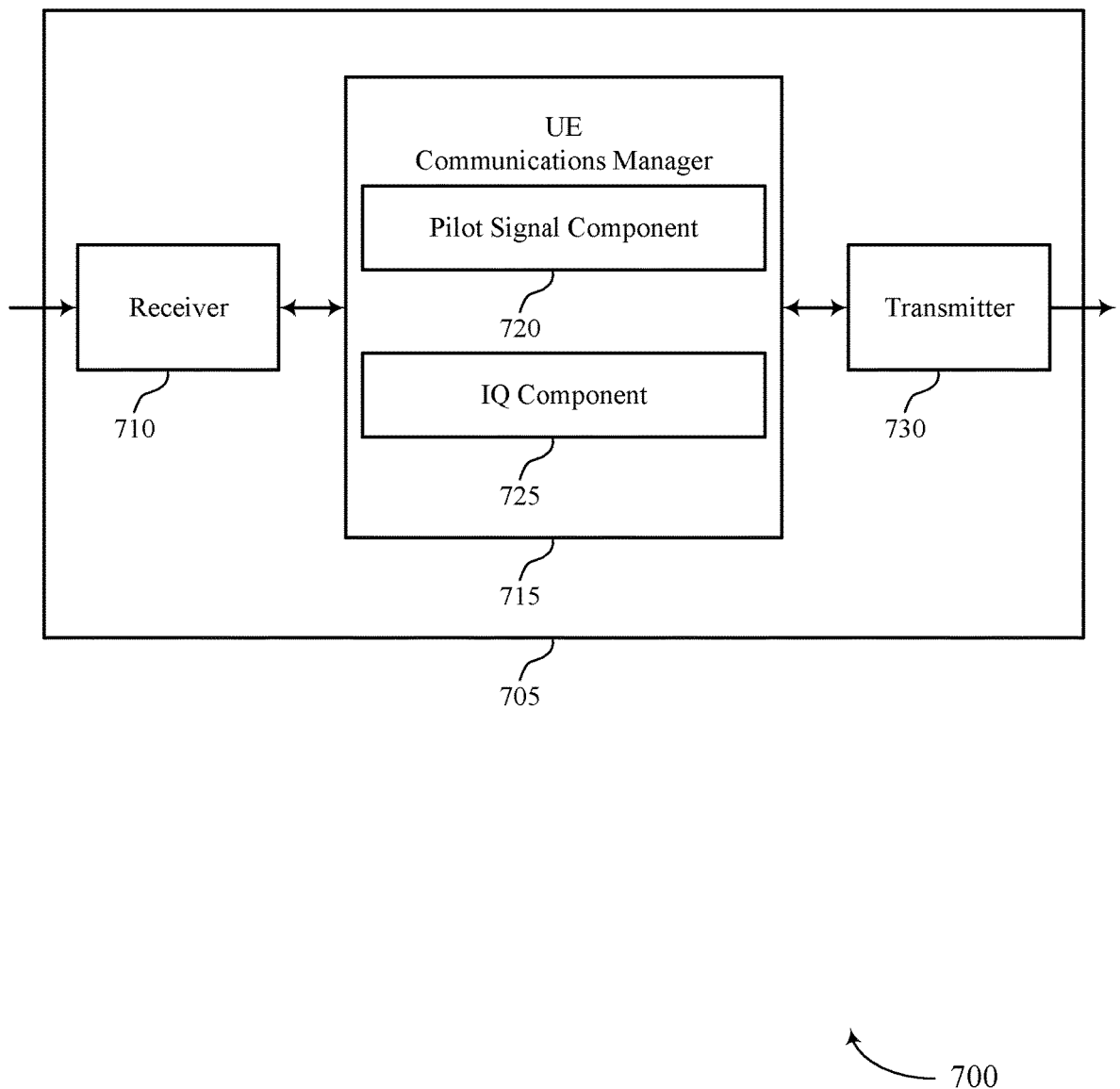

FIG. 7 shows a block diagram 700 of a device 705 that supports IQ mismatch estimation pilot signaling in accordance with aspects of the present disclosure. The device 705 may be an example of aspects of a device 605, or a UE 115 as described herein. The device 705 may include a receiver 710, a UE communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to IQ mismatch estimation pilot signaling). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a pilot signal component 720 and an IQ component 725. The UE communications manager 715 may be an example of aspects of the UE communications manager 910 described herein.

The pilot signal component 720 may receive pilot signaling associated with IQ mismatch estimation for a set of antennas of a base station and measure pilot signals for each of the set of antennas based on a pilot signal pattern of the pilot signaling. The IQ component 725 may calculate an estimation of an IQ mismatch for each antenna of the set of antennas of the base station based on measuring the pilot signals.

The transmitter 730 may transmit signals generated by other components of the device 705. In some examples, the transmitter 730 may be collocated with a receiver 710 in a transceiver component. For example, the transmitter 730 may be an example of aspects of the transceiver 920 described with reference to FIG. 9. The transmitter 730 may utilize a single antenna or a set of antennas.

Figure 8:
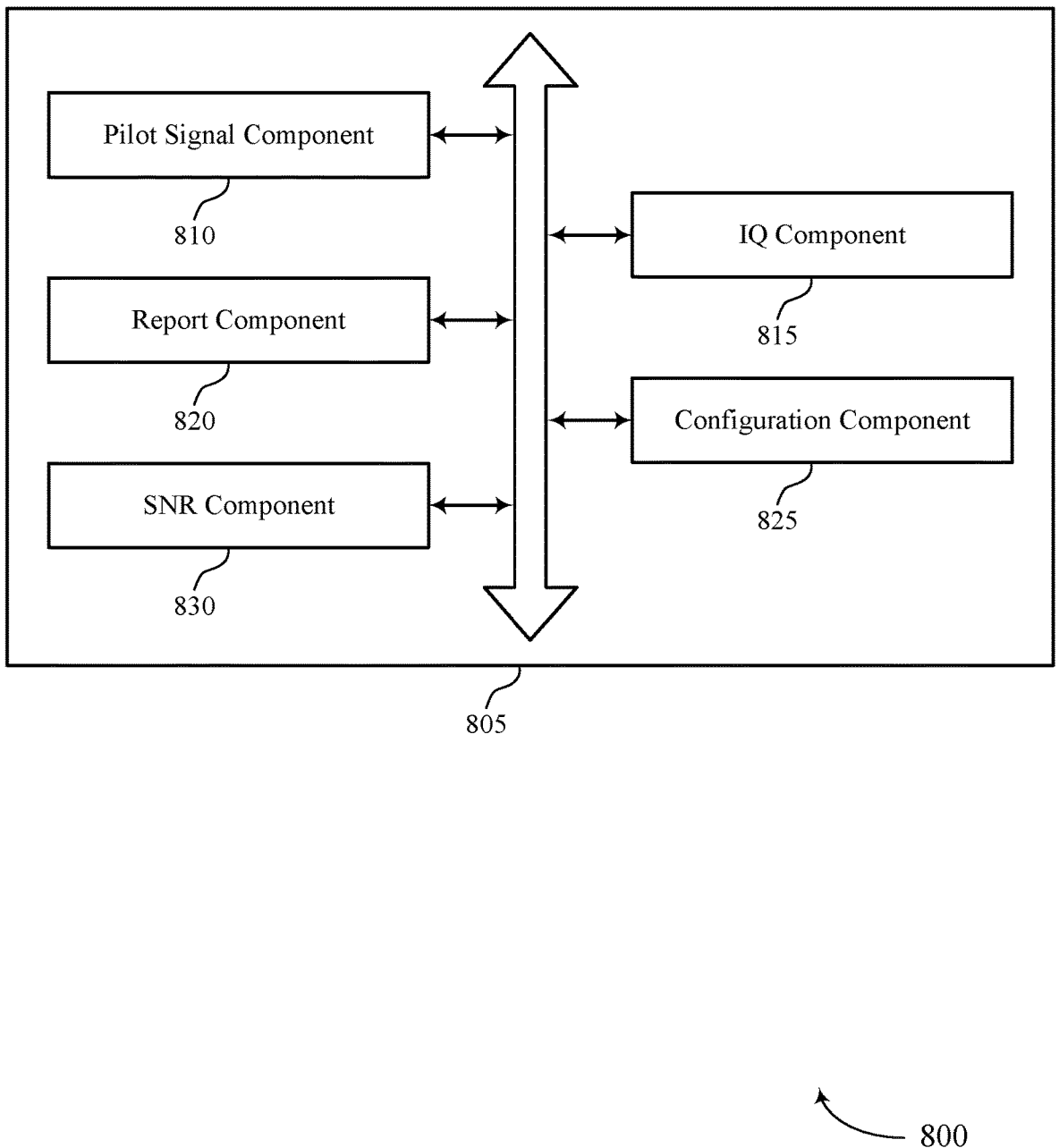
FIG. 8 shows a block diagram of a user equipment (UE) communications manager that supports IQ mismatch estimation pilot signaling in accordance with aspects of the present disclosure.

FIG. 8 shows a block diagram 800 of a UE communications manager 805 that supports IQ mismatch estimation pilot signaling in accordance with aspects of the present disclosure. The UE communications manager 805 may be an example of aspects of a UE communications manager 615, a UE communications manager 715, or a UE communications manager 910 described herein. The UE communications manager 805 may include a pilot signal component 810, an IQ component 815, a report component 820, a configuration component 825, and a SNR component 830. Each of these components may communicate, directly or indirectly, with one another (e.g., via one or more buses).

The pilot signal component 810 may receive pilot signaling associated with IQ mismatch estimation for a set of antennas of a base station. In some examples, the pilot signal component 810 may measure pilot signals for each of the set of antennas based on a pilot signal pattern of the pilot signaling. In some cases, the pilot signal pattern extends over a bandwidth for the UE. In some cases, the pilot signal pattern is symmetric over a bandwidth allocation. In some cases, the pilot signal pattern is symmetric with respect to a frequency bin associated with the bandwidth allocation. In some cases, the frequency bin corresponds to a center frequency of the bandwidth allocation.

The IQ component 815 may calculate an estimation of an IQ mismatch for each antenna of the set of antennas of the base station based on measuring the pilot signals. In some examples, the IQ component 815 may determine an estimation of a channel for each of the set of antennas of the base station based on the pilot signal pattern of the pilot signaling. The report component 820 may transmit a report including an indication of the estimation of the IQ mismatch for each antenna of the set of antennas of the base station. The configuration component 825 may receive configuration signaling that configures the pilot signal pattern for each of the set of antennas of the base station. In some cases, the configuration signaling includes a period associated with the pilot signaling. The SNR component 830 may determine an estimation of a SNR for each of the set of antennas of the base station based on the pilot signal pattern of the pilot signaling.

Figure 9:
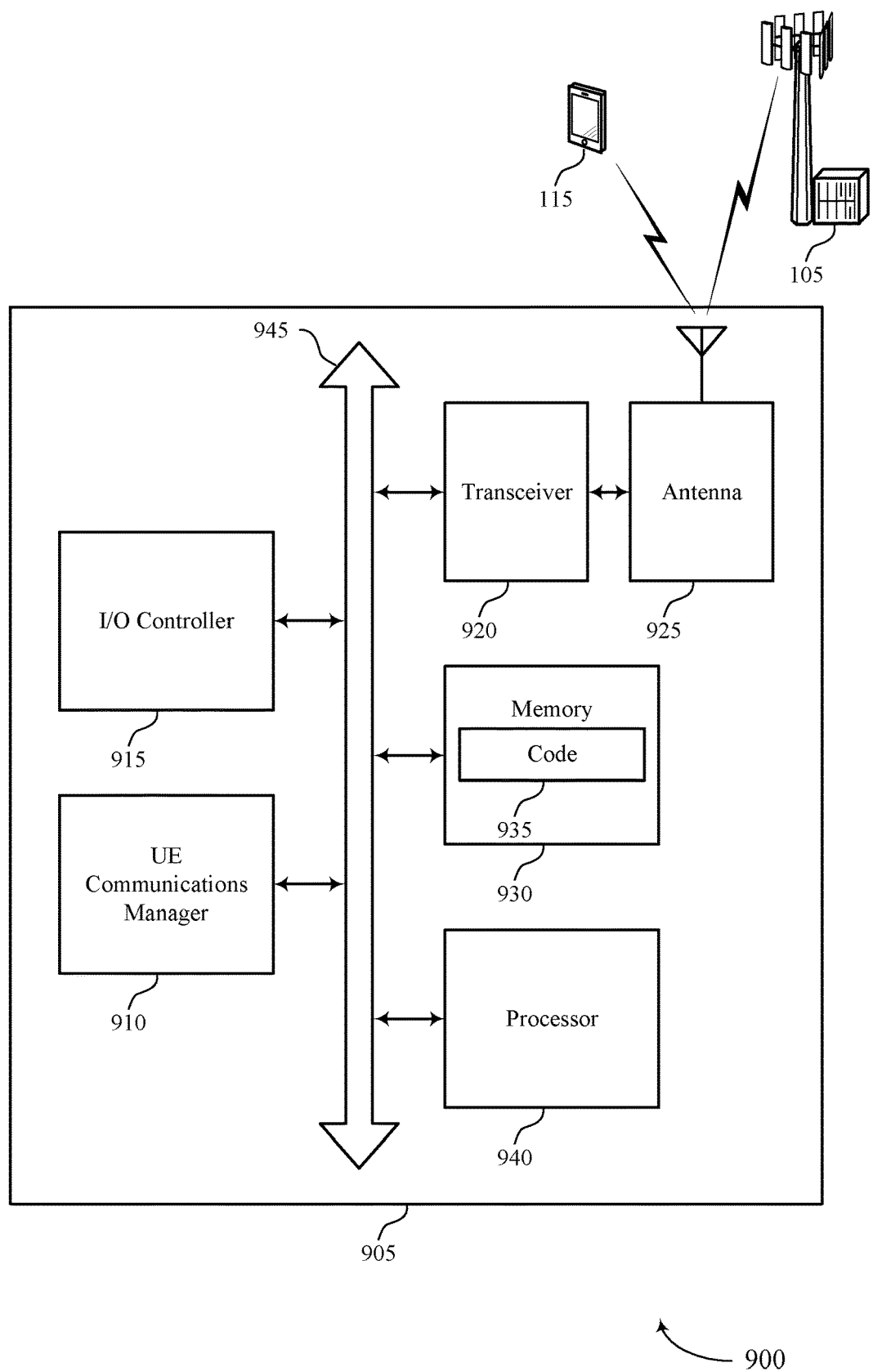
FIG. 9 shows a diagram of a system including a device that supports IQ mismatch estimation pilot signaling in accordance with aspects of the present disclosure.

FIG. 9 shows a diagram of a system 900 including a device 905 that supports IQ mismatch estimation pilot signaling in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive pilot signaling associated with IQ mismatch estimation for a set of antennas of a base station, measure pilot signals for each of the set of antennas based on a pilot signal pattern of the pilot signaling, and calculate an estimation of an IQ mismatch for each antenna of the set of antennas of the base station based on measuring the pilot signals. By including or configuring the UE communications manager 910 in accordance with examples as described herein, the device 905 may support techniques for improved communication reliability, reduced latency, improved coordination between devices, and longer battery life.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases, the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor 940 to perform various functions described herein. In some cases, the memory 930 may contain, among other things, a basic input/output system (BIOS), which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting IQ mismatch estimation pilot signaling).

Figure 10:
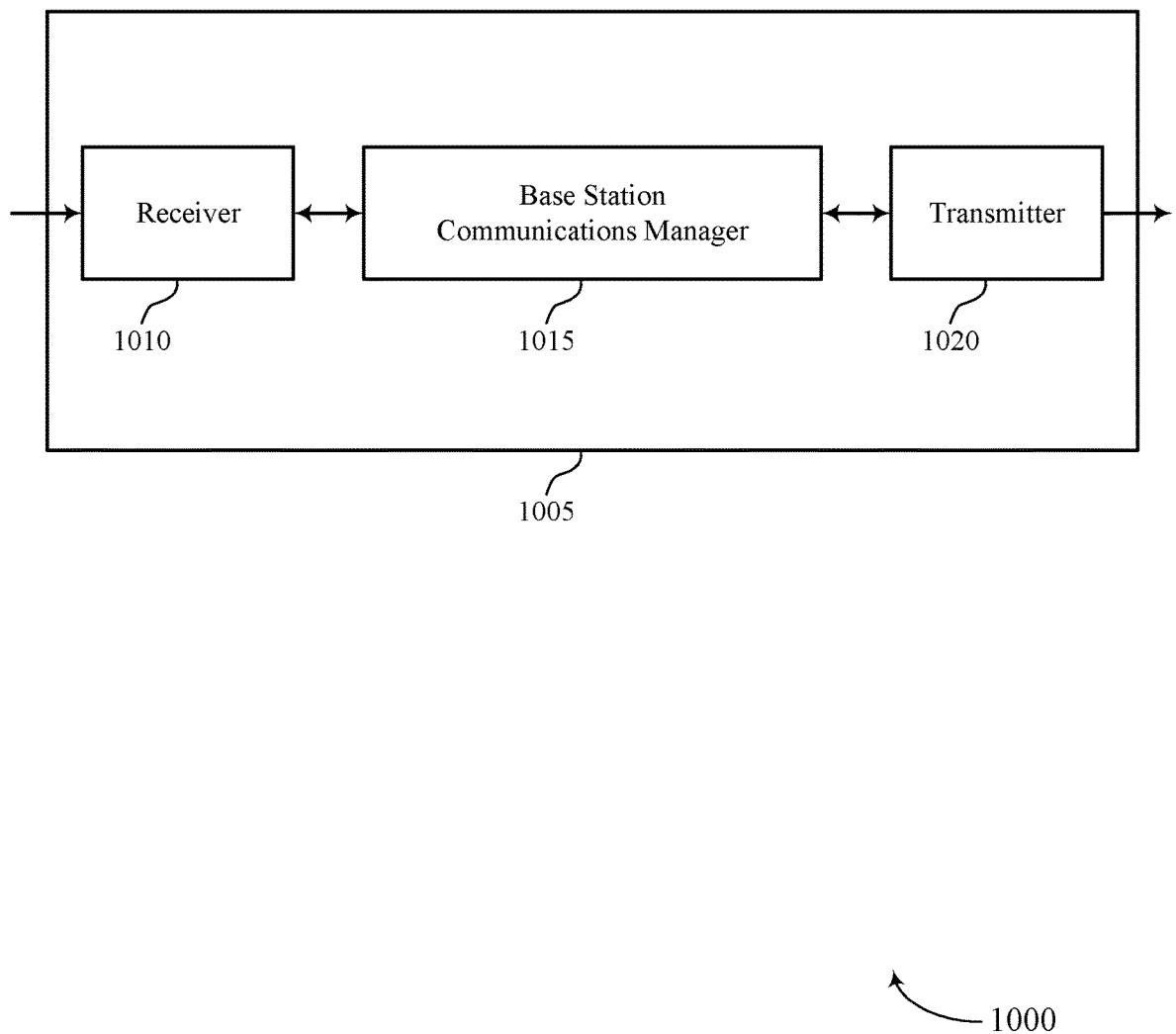
FIGS. 10 and 11 show block diagrams of devices that support IQ mismatch estimation pilot signaling in accordance with aspects of the present disclosure.

FIG. 10 shows a block diagram 1000 of a device 1005 that supports IQ mismatch estimation pilot signaling in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to IQ mismatch estimation pilot signaling). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may determine a pilot signal pattern of a pilot signaling for IQ mismatch estimation for a set of antennas of the base station, transmit pilot signals for each of the set of antennas based on the pilot signal pattern of the pilot signaling, and receive a report including an indication of the estimation of the IQ mismatch for each antenna of the set of antennas of the base station based on the transmitted pilot signals. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
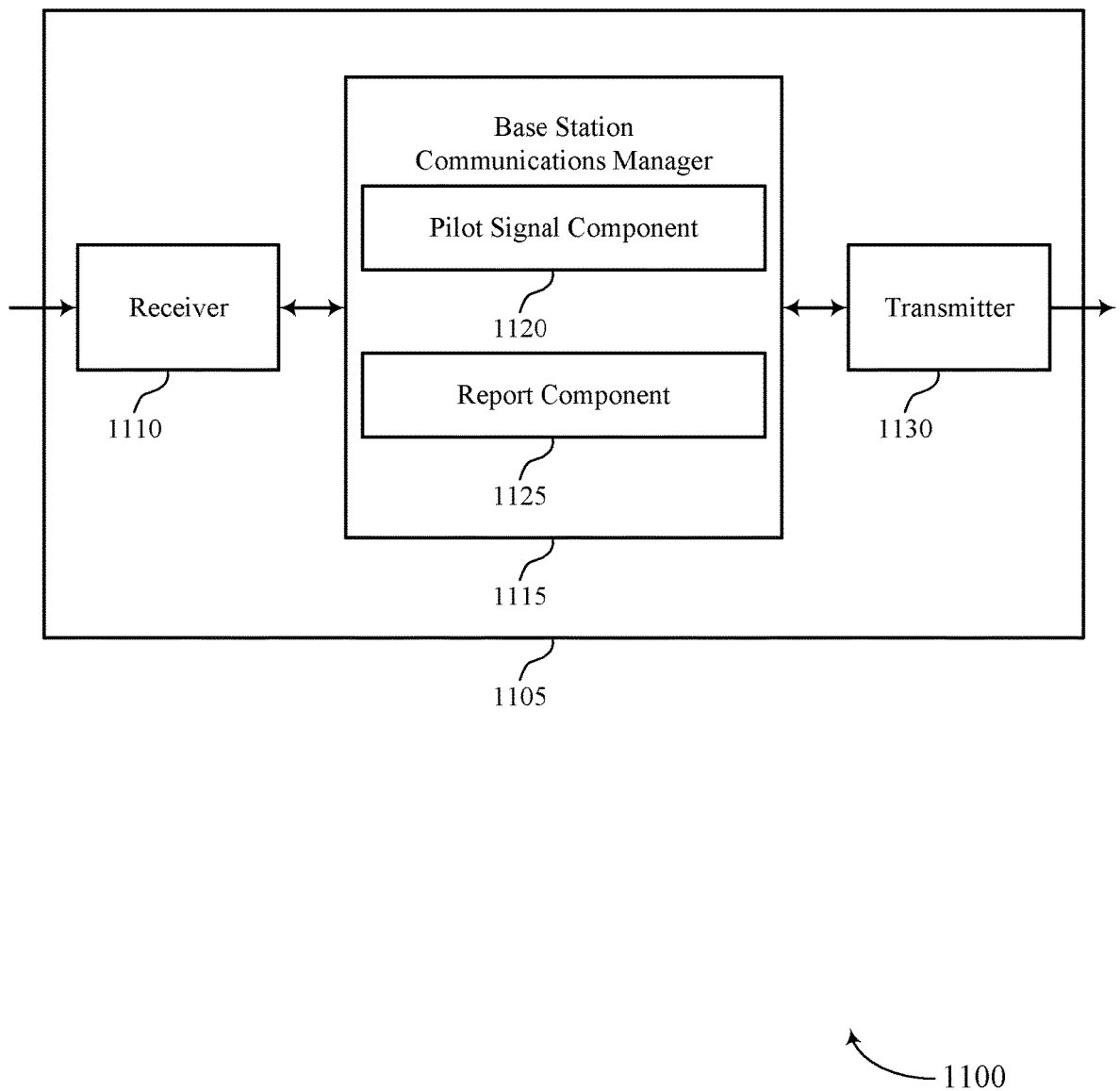

FIG. 11 shows a block diagram 1100 of a device 1105 that supports IQ mismatch estimation pilot signaling in accordance with aspects of the present disclosure. The device 1105 may be an example of aspects of a device 1005, or a base station 105 as described herein. The device 1105 may include a receiver 1110, a base station communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to IQ mismatch estimation pilot signaling). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a pilot signal component 1120 and a report component 1125. The base station communications manager 1115 may be an example of aspects of the base station communications manager 1310 described herein.

The pilot signal component 1120 may determine a pilot signal pattern of a pilot signaling for IQ mismatch estimation for a set of antennas of the base station and transmit pilot signals for each of the set of antennas based on the pilot signal pattern of the pilot signaling. The report component 1125 may receive a report including an indication of the estimation of the IQ mismatch for each antenna of the set of antennas of the base station based on the transmitted pilot signals.

The transmitter 1130 may transmit signals generated by other components of the device 1105. In some examples, the transmitter 1130 may be collocated with a receiver 1110 in a transceiver component. For example, the transmitter 1130 may be an example of aspects of the transceiver 1320 described with reference to FIG. 13. The transmitter 1130 may utilize a single antenna or a set of antennas.

Figure 12:
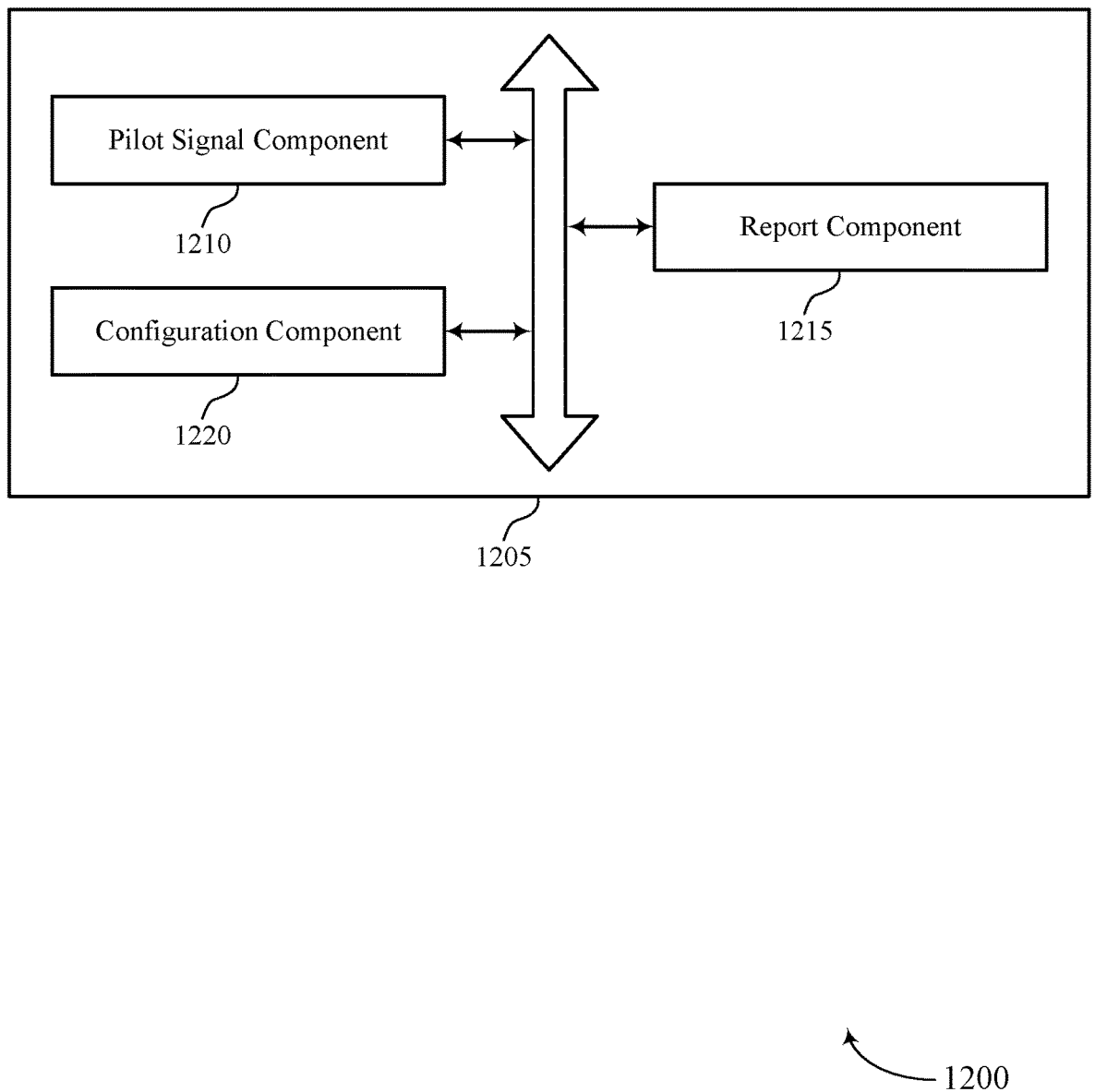
FIG. 12 shows a block diagram of a base station communications manager that supports IQ mismatch estimation pilot signaling in accordance with aspects of the present disclosure.

FIG. 12 shows a block diagram 1200 of a base station communications manager 1205 that supports IQ mismatch estimation pilot signaling in accordance with aspects of the present disclosure. The base station communications manager 1205 may be an example of aspects of a base station communications manager 1015, a base station communications manager 1115, or a base station communications manager 1310 described herein. The base station communications manager 1205 may include a pilot signal component 1210, a report component 1215, and a configuration component 1220. Each of these components may communicate, directly or indirectly, with one another (e.g., via one or more buses).

The pilot signal component 1210 may determine a pilot signal pattern of a pilot signaling for IQ mismatch estimation for a set of antennas of the base station. In some examples, the pilot signal component 1210 may transmit pilot signals for each of the set of antennas based on the pilot signal pattern of the pilot signaling. In some cases, the pilot signal pattern is based on a number of antennas of the base station. In some cases, the pilot signal pattern extends over a bandwidth for a receiving UE. In some cases, the pilot signal pattern is symmetric over a bandwidth allocation. In some cases, the pilot signal pattern is symmetric with respect to a frequency bin associated with the bandwidth allocation. In some cases, the frequency bin corresponds to a center frequency of the bandwidth allocation.

The report component 1215 may receive a report including an indication of the estimation of the IQ mismatch for each antenna of the set of antennas of the base station based on the transmitted pilot signals. The configuration component 1220 may transmit configuration signaling that configures the pilot signal pattern for each of the set of antennas of the base station. In some examples, the configuration component 1220 may determine the period associated with the pilot signaling based on a number of the set of antennas, a number of antennas associated with the pilot signals per symbol, a number of symbols between symbols conveying the pilot signals, a symbol offset value relative to a staring symbol, or a combination thereof. In some cases, the configuration signaling includes a period associated with the pilot signaling.

Figure 13:
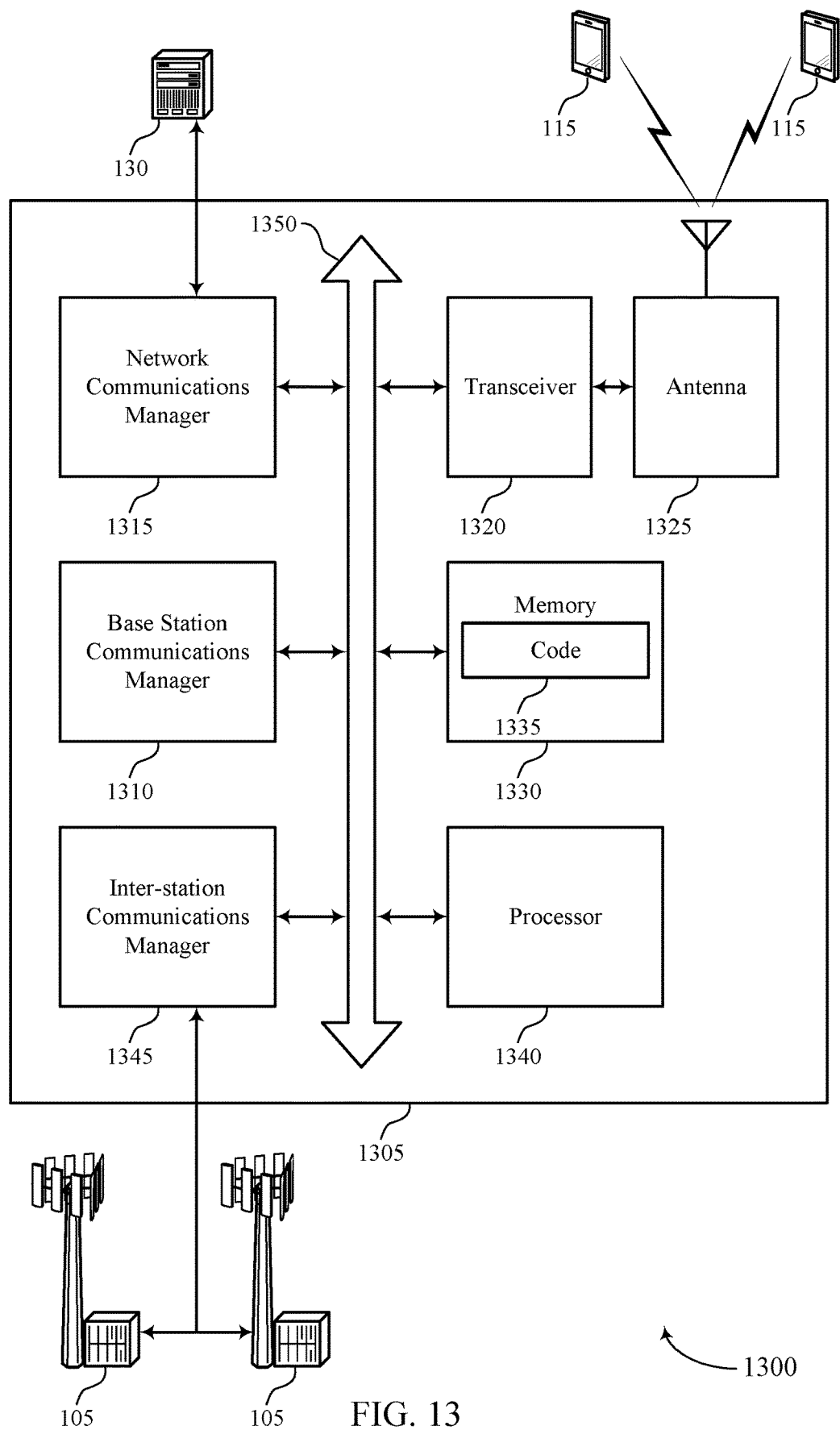
FIG. 13 shows a diagram of a system including a device that supports IQ mismatch estimation pilot signaling in accordance with aspects of the present disclosure.

FIG. 13 shows a diagram of a system 1300 including a device 1305 that supports IQ mismatch estimation pilot signaling in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may determine a pilot signal pattern of a pilot signaling for IQ mismatch estimation for a set of antennas of the base station, transmit pilot signals for each of the set of antennas based on the pilot signal pattern of the pilot signaling, and receive a report including an indication of the estimation of the IQ mismatch for each antenna of the set of antennas of the base station based on the transmitted pilot signals.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases, the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting IQ mismatch estimation pilot signaling).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
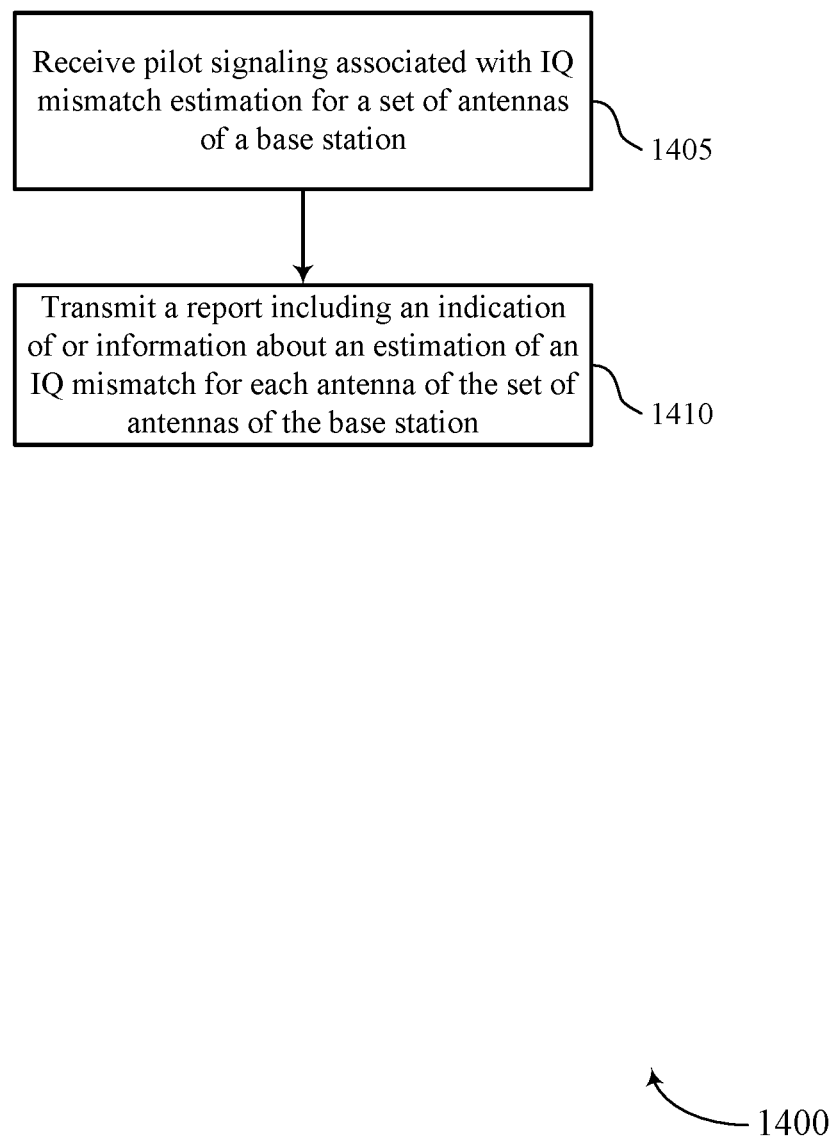
FIGS. 14 through 16 show flowcharts illustrating methods that support IQ mismatch estimation pilot signaling in accordance with aspects of the present disclosure.

FIG. 14 shows a flowchart illustrating a method 1400 that supports IQ mismatch estimation pilot signaling in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive pilot signaling associated with IQ mismatch estimation for a set of antennas of a base station. The operations of 1405 may be performed according to the methods described herein. In some examples, aspects of the operations of 1405 may be performed by a pilot signal component as described with reference to FIGS. 6 through 9.

At 1410, the UE may transmit a report including an indication of or information about an estimation of an IQ mismatch for each antenna of the set of antennas of the base station. The operations of 1410 may be performed according to the methods described herein. In some examples, aspects of the operations of 1410 may be performed by a report component as described with reference to FIGS. 6 through 9.

Figure 15:
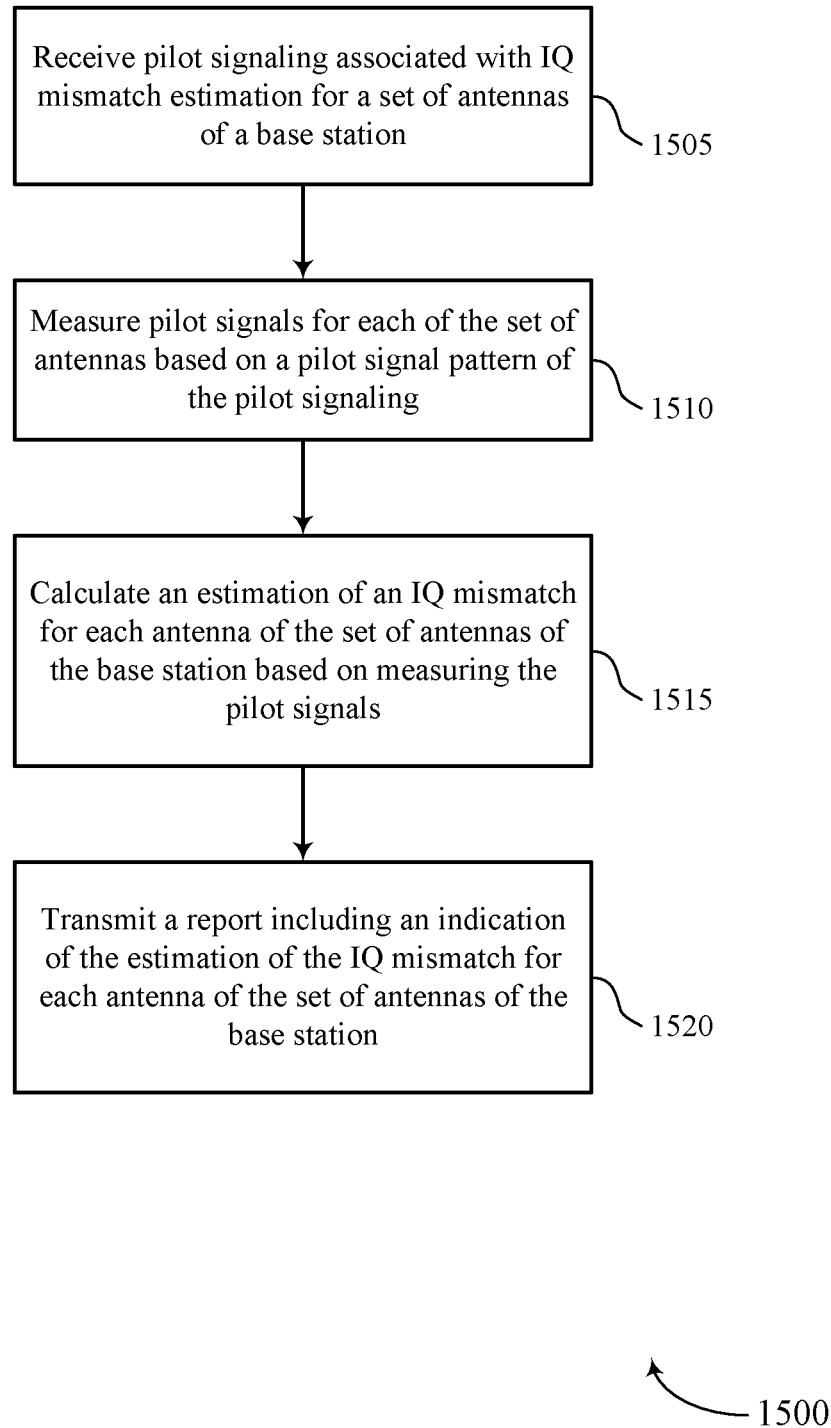

FIG. 15 shows a flowchart illustrating a method 1500 that supports IQ mismatch estimation pilot signaling in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive pilot signaling associated with IQ mismatch estimation for a set of antennas of a base station. The operations of 1505 may be performed according to the methods described herein. In some examples, aspects of the operations of 1505 may be performed by a pilot signal component as described with reference to FIGS. 6 through 9.

At 1510, the UE may measure pilot signals for each of the set of antennas based on a pilot signal pattern of the pilot signaling. The operations of 1510 may be performed according to the methods described herein. In some examples, aspects of the operations of 1510 may be performed by a pilot signal component as described with reference to FIGS. 6 through 9.

At 1515, the UE may calculate an estimation of an IQ mismatch for each antenna of the set of antennas of the base station based on measuring the pilot signals. The operations of 1515 may be performed according to the methods described herein. In some examples, aspects of the operations of 1515 may be performed by an IQ component as described with reference to FIGS. 6 through 9.

At 1520, the UE may transmit a report including an indication of the estimation of the IQ mismatch for each antenna of the set of antennas of the base station. The operations of 1520 may be performed according to the methods described herein. In some examples, aspects of the operations of 1520 may be performed by a report component as described with reference to FIGS. 6 through 9.

Figure 16:
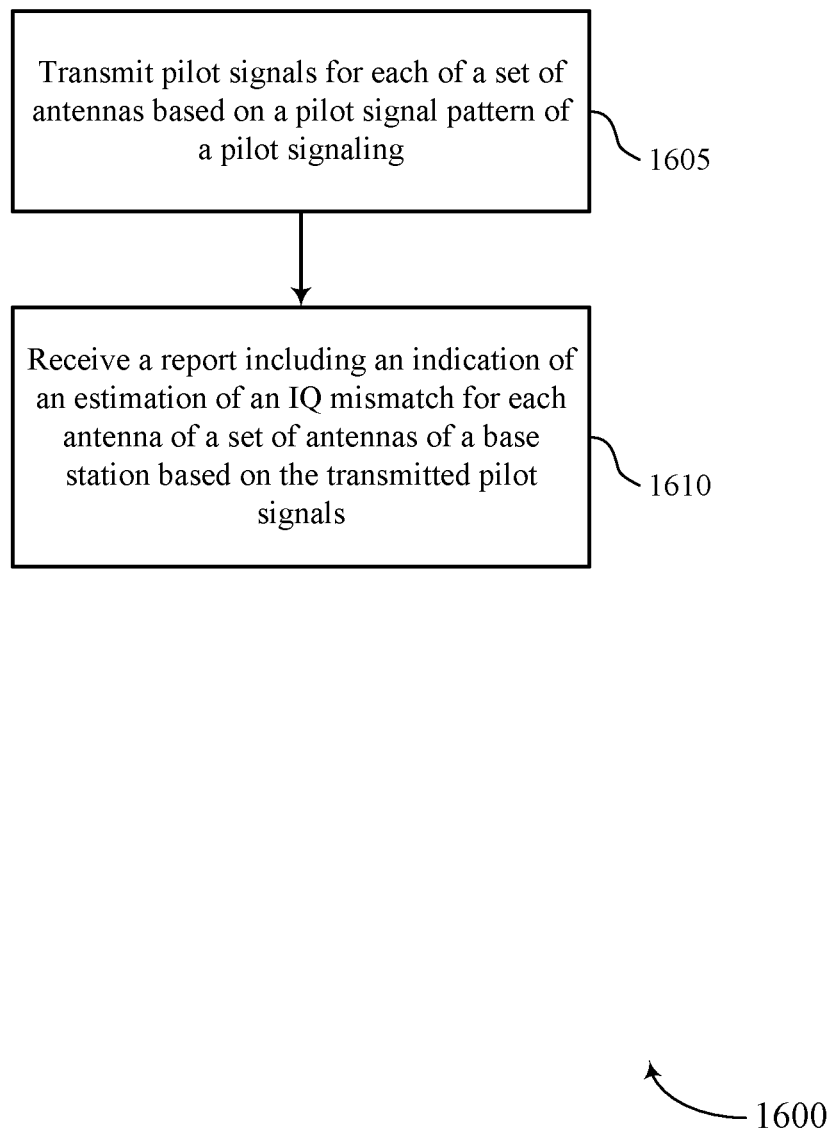

FIG. 16 shows a flowchart illustrating a method 1600 that supports IQ mismatch estimation pilot signaling in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit pilot signals for each of a set of antennas based on a pilot signal pattern of a pilot signaling. The operations of 1605 may be performed according to the methods described herein. In some examples, aspects of the operations of 1605 may be performed by a pilot signal component as described with reference to FIGS. 10 through 13.

At 1610, the base station may receive a report including an indication of an estimation of an IQ mismatch for each antenna of a set of antennas of a base station based on the transmitted pilot signals. The operations of 1610 may be performed according to the methods described herein. In some examples, aspects of the operations of 1610 may be performed by a report component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving pilot signaling associated with IQ mismatch estimation for a plurality of transmit antennas of a base station; measuring pilot signals for each of the plurality of transmit antennas based at least in part on a pilot signal pattern of the pilot signaling; and calculating an estimation of an IQ mismatch for each transmit antenna of the plurality of transmit antennas of the base station based at least in part on measuring the pilot signals.

Aspect 2: The method of aspect 1, further comprising: transmitting a report comprising an indication of the estimation of the IQ mismatch for each transmit antenna of the plurality of transmit antennas of the base station.

Aspect 3: The method of any of aspects 1 through 2, further comprising: receiving configuration signaling that configures the pilot signal pattern for each of the plurality of transmit antennas of the base station.

Aspect 4: The method of aspect 3, wherein the configuration signaling comprises a period associated with the pilot signaling.

Aspect 5: The method of any of aspects 1 through 4, wherein the pilot signal pattern extends over a bandwidth for the UE.

Aspect 6: The method of any of aspects 1 through 5, wherein the pilot signal pattern is symmetric over a bandwidth allocation.

Aspect 7: The method of aspect 6, wherein the pilot signal pattern is symmetric with respect to a frequency bin associated with the bandwidth allocation.

Aspect 8: The method of aspect 7, wherein the frequency bin corresponds to a center frequency of the bandwidth allocation.

Aspect 9: The method of any of aspects 1 through 8, further comprising: determining an estimation of a SNR for each of the plurality of transmit antennas of the base station based at least in part on the pilot signal pattern of the pilot signaling.

Aspect 10: The method of any of aspects 1 through 9, further comprising: determining an estimation of a channel for each of the plurality of transmit antennas of the base station based at least in part on the pilot signal pattern of the pilot signaling, wherein calculating the estimation of the IQ mismatch for each transmit antenna of the plurality of transmit antennas of the base station is based at least in part on the estimation of the channel.

Aspect 11: A method for wireless communication at a base station, comprising: determining a pilot signal pattern of a pilot signaling for IQ mismatch estimation for a plurality of transmit antennas of the base station; transmitting pilot signals for each of the plurality of transmit antennas based at least in part on the pilot signal pattern of the pilot signaling; and receiving a report comprising an indication of the estimation of the IQ mismatch for each transmit antenna of the plurality of transmit antennas of the base station based at least in part on the transmitted pilot signals.

Aspect 12: The method of aspect 11, wherein the pilot signal pattern is based at least in part on a number of transmit antennas of the base station.

Aspect 13: The method of any of aspects 11 through 12, further comprising: transmitting configuration signaling that configures the pilot signal pattern for each of the plurality of transmit antennas of the base station.

Aspect 14: The method of aspect 13, wherein the configuration signaling comprises a period associated with the pilot signaling.

Aspect 15: The method of aspect 14, further comprising: determining the period associated with the pilot signaling based at least in part on a number of the plurality of transmit antennas, a number of transmit antennas associated with the pilot signals per symbol, a number of symbols between symbols conveying the pilot signals, a symbol offset value relative to a staring symbol, or a combination thereof.

Aspect 16: The method of any of aspects 11 through 15, wherein the pilot signal pattern extends over a bandwidth for a receiving UE.

Aspect 17: The method of any of aspects 11 through 16, wherein the pilot signal pattern is symmetric over a bandwidth allocation.

Aspect 18: The method of aspect 17, wherein the pilot signal pattern is symmetric with respect to a frequency bin associated with the bandwidth allocation.

Aspect 19: The method of aspect 18, wherein the frequency bin corresponds to a center frequency of the bandwidth allocation.

Aspect 20: An apparatus for wireless communication at a UE, comprising a processor; memory coupled with the processor; and instructions stored in the memory and executable by the processor to cause the apparatus to perform a method of any of aspects 1 through 10.

Aspect 21: An apparatus for wireless communication at a UE, comprising at least one means for performing a method of any of aspects 1 through 10.

Aspect 22: A non-transitory computer-readable medium storing code for wireless communication at a UE, the code comprising instructions executable by a processor to perform a method of any of aspects 1 through 10.

Aspect 23: An apparatus for wireless communication at a base station, comprising a processor; memory coupled with the processor; and instructions stored in the memory and executable by the processor to cause the apparatus to perform a method of any of aspects 11 through 19.

Aspect 24: An apparatus for wireless communication at a base station, comprising at least one means for performing a method of any of aspects 11 through 19.

Aspect 25: A non-transitory computer-readable medium storing code for wireless communication at a base station, the code comprising instructions executable by a processor to perform a method of any of aspects 11 through 19.

The following provides an overview of other aspects of the present disclosure:

Aspect 1: A method for wireless communication at a UE, comprising: receiving pilot signaling associated with IQ mismatch estimation for a plurality of antennas of a base station; and transmitting a report comprising an indication of or information about an estimation of an inphase and quadrature mismatch for each antenna of the plurality of antennas of the base station.

Aspect 2: The method of aspect 1, further comprising: measuring pilot signals for each of the plurality of antennas based at least in part on a pilot signal pattern of the pilot signaling; and calculating the estimation of an inphase and quadrature mismatch for each antenna of the plurality of antennas of the base station based at least in part on measuring the pilot signals.

Aspect 3: The method of any of aspects 1 through 2, further comprising: receiving configuration signaling that configures the pilot signal pattern for each of the plurality of antennas of the base station.

Aspect 4: The method of aspect 3, wherein the configuration signaling comprises a period associated with the pilot signaling.

Aspect 5: The method of any of aspects 1 through 4, wherein the pilot signal pattern extends over a bandwidth for the UE.

Aspect 6: The method of any of aspects 1 through 5, wherein the pilot signal pattern is symmetric over a bandwidth allocation.

Aspect 7: The method of aspect 6, wherein the pilot signal pattern is symmetric with respect to a frequency bin associated with the bandwidth allocation.

Aspect 8: The method of aspect 7, wherein the frequency bin corresponds to a center frequency of the bandwidth allocation.

Aspect 9: The method of any of aspects 1 through 8, further comprising: determining an estimation of a SNR for each of the plurality of antennas of the base station based at least in part on the pilot signal pattern of the pilot signaling.

Aspect 10: The method of any of aspects 1 through 9, further comprising: determining an estimation of a channel for each of the plurality of antennas of the base station based at least in part on the pilot signal pattern of the pilot signaling, wherein calculating the estimation of the IQ mismatch for each antenna of the plurality of antennas of the base station is based at least in part on the estimation of the channel.

Aspect 11: A method for wireless communication at a base station, comprising: transmitting pilot signals for each of a plurality of antennas based at least in part on a pilot signal pattern of a pilot signaling; and receiving a report comprising an indication of or information about an estimation of an IQ mismatch for each antenna of the plurality of antennas of the base station based at least in part on the transmitted pilot signals.

Aspect 12: The method of aspect 11, further comprising: determining a pilot signal pattern of the pilot signaling for the inphase and quadrature mismatch estimation for the plurality of antennas of the base station.

Aspect 13: The method of aspect 11, wherein the pilot signal pattern is based at least in part on a number of antennas of the base station.

Aspect 14: The method of any of aspects 11 through 13, further comprising: transmitting configuration signaling that configures the pilot signal pattern for each of the plurality of antennas of the base station.

Aspect 15: The method of aspect 14, wherein the configuration signaling comprises a period associated with the pilot signaling.

Aspect 16: The method of aspect 15, further comprising: determining the period associated with the pilot signaling based at least in part on a number of the plurality of antennas, a number of antennas associated with the pilot signals per symbol, a number of symbols between symbols conveying the pilot signals, a symbol offset value relative to a staring symbol, or a combination thereof.

Aspect 17: The method of any of aspects 11 through 16, wherein the pilot signal pattern extends over a bandwidth for a receiving UE.

Aspect 18: The method of any of aspects 11 through 17, wherein the pilot signal pattern is symmetric over a bandwidth allocation.

Aspect 19: The method of aspect 17, wherein the pilot signal pattern is symmetric with respect to a frequency bin associated with the bandwidth allocation, the frequency bin corresponds to a center frequency of the bandwidth allocation.

Aspect 20: An apparatus for wireless communication at a UE, comprising a processor; memory coupled with the processor; the processor configured to perform a method of any of aspects 1 through 10.

Aspect 21: An apparatus for wireless communication at a UE, comprising at least one means for performing a method of any of aspects 1 through 10.

Aspect 22: A non-transitory computer-readable medium storing code for wireless communication at a UE, the code comprising instructions executable by a processor to perform a method of any of aspects 1 through 10.

Aspect 23: An apparatus for wireless communication at a base station, comprising a processor; memory coupled with the processor; the processor configured to perform a method of any of aspects 11 through 19.

Aspect 24: An apparatus for wireless communication at a base station, comprising at least one means for performing a method of any of aspects 11 through 19.

Aspect 25: A non-transitory computer-readable medium storing code for wireless communication at a base station, the code comprising instructions executable by a processor to perform a method of any of aspects 11 through 19.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving pilot signaling associated with inphase and quadrature mismatch estimation for a plurality of antennas of a base station; and
   transmitting a report comprising an estimation of an inphase and quadrature mismatch for each antenna of the plurality of antennas of the base station.

2. The method of claim 1, further comprising:
   measuring pilot signals for each of the plurality of antennas in accordance with a pilot signal pattern of the pilot signaling; and
   calculating the estimation of an inphase and quadrature mismatch for each antenna of the plurality of antennas of the base station in accordance with the measured pilot signals.

3. The method of claim 2, further comprising:
   receiving configuration signaling that configures the pilot signal pattern for each of the plurality of antennas of the base station.

4. The method of claim 3, wherein the configuration signaling comprises a period associated with the pilot signaling.

5. The method of claim 2, wherein the pilot signal pattern extends over a bandwidth for the UE.

6. The method of claim 2, wherein the pilot signal pattern is symmetric over a bandwidth allocation.

7. The method of claim 6, wherein the pilot signal pattern is symmetric with respect to a frequency bin associated with the bandwidth allocation.

8. The method of claim 7, wherein the frequency bin corresponds to a center frequency of the bandwidth allocation.

9. The method of claim 2,
   wherein an estimation of a signal-to-noise ratio for each of the plurality of antennas of the base station is associated with the pilot signal pattern of the pilot signaling.

10. The method of claim 2,
    wherein an estimation of a channel for each of the plurality of antennas of the base station is associated with the pilot signal pattern of the pilot signaling, and
    wherein calculating the estimation of the inphase and quadrature mismatch for each antenna of the plurality of antennas of the base station is in accordance with the estimation of the channel.

11. A method for wireless communication at a base station, comprising:
    transmitting pilot signals for each of a plurality of antennas in accordance with a pilot signal pattern of a pilot signaling; and
    receiving a report comprising an estimation of an inphase and quadrature mismatch for each antenna of the plurality of antennas of the base station.

12. The method of claim 11,
    wherein the pilot signal pattern of the pilot signaling for the inphase and quadrature mismatch estimation is for the plurality of antennas of the base station.

13. The method of claim 12, wherein the pilot signal pattern is associated with a number of antennas of the base station.

14. The method of claim 12, further comprising:
    transmitting configuration signaling that configures the pilot signal pattern for each of the plurality of antennas of the base station.

15. The method of claim 14, wherein the configuration signaling comprises a period associated with the pilot signaling.

16. The method of claim 15,
    wherein the period associated with the pilot signaling is associated with a number of the plurality of antennas, a number of antennas associated with the pilot signals per symbol, a number of symbols between symbols conveying the pilot signals, a symbol offset value relative to a staring symbol, or a combination thereof.

17. The method of claim 12, wherein the pilot signal pattern extends over a bandwidth for a receiving user equipment (UE).

18. The method of claim 12, wherein the pilot signal pattern is symmetric over a bandwidth allocation.

19. The method of claim 18, wherein the pilot signal pattern is symmetric with respect to a frequency bin associated with the bandwidth allocation, the frequency bin corresponds to a center frequency of the bandwidth allocation.

20. An apparatus for wireless communication, comprising:
    a processor,
    memory coupled with the processor; and
    instructions stored in memory and operable, when executed by the processor to cause the apparatus to:
    receive pilot signaling associated with inphase and quadrature mismatch estimation for a plurality of antennas of a base station; and
    transmit a report comprising an estimation of an inphase and quadrature mismatch for each antenna of the plurality of antennas of the base station.

21. The apparatus of claim 20, wherein the processor causes the apparatus to:
    measure pilot signals for each of the plurality of antennas in accordance with a pilot signal pattern of the pilot signaling; and
    calculate the estimation of the inphase and quadrature mismatch for each antenna of the plurality of antennas of the base station in accordance with the measured pilot signals.

22. The apparatus of claim 21, wherein the processor causes the apparatus to:
  receive configuration signaling that configures the pilot signal pattern for each of the plurality of antennas of the base station.

23. The apparatus of claim 22, wherein the configuration signaling comprises a period associated with the pilot signaling.

24. The apparatus of claim 21, wherein the pilot signal pattern extends over a bandwidth for the apparatus.

25. The apparatus of claim 21, wherein the pilot signal pattern is symmetric over a bandwidth allocation.

26. The apparatus of claim 25, wherein the pilot signal pattern is symmetric with respect to a frequency bin associated with the bandwidth allocation.

27. The apparatus of claim 26, wherein the frequency bin corresponds to a center frequency of the bandwidth allocation.

28. The apparatus of claim 21, wherein
  an estimation of a signal-to-noise ratio for each of the plurality of antennas of the base station is associated with the pilot signal pattern of the pilot signaling.

29. The apparatus of claim 21, wherein
  an estimation of a channel for each of the plurality of antennas of the base station is associated with the pilot signal pattern of the pilot signaling, and
  wherein to calculate the estimation of the inphase and quadrature mismatch for each antenna of the plurality of antennas of the base station is in accordance with the estimation of the channel.

30. An apparatus for wireless communication, comprising:
  a processor,
  memory coupled with the processor; and
  instructions stored in memory and operable, when executed by the processor to cause the apparatus to:
    transmit pilot signals for each of a plurality of antennas in accordance with a pilot signal pattern of the pilot signaling; and
    receive a report comprising an estimation of an inphase and quadrature mismatch for each antenna of the plurality of antennas of the apparatus.

* * * * *